US012244549B2

(12) United States Patent
Boyd et al.

(10) Patent No.: US 12,244,549 B2
(45) Date of Patent: Mar. 4, 2025

(54) OFF-PLATFORM MESSAGING SYSTEM

(71) Applicant: Snap Inc., Santa Monica, CA (US)

(72) Inventors: Nathan Kenneth Boyd, Los Angeles, CA (US); Benedict Copping, Los Angeles, CA (US); Christie Marie Heikkinen, Santa Monica, CA (US); Celia Nicole Mourkogiannis, Los Angeles, CA (US); David Taitz, Santa Monica, CA (US); Mai Chi Tran, Garden Grove, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/818,268

(22) Filed: Aug. 8, 2022

(65) Prior Publication Data

US 2022/0377031 A1 Nov. 24, 2022

Related U.S. Application Data

(63) Continuation of application No. 16/835,080, filed on Mar. 30, 2020, now Pat. No. 11,411,900.

(51) Int. Cl.
*H04L 51/046* (2022.01)
*G06F 3/04817* (2022.01)
(Continued)

(52) U.S. Cl.
CPC ........ *H04L 51/046* (2013.01); *G06F 3/04817* (2013.01); *G06F 9/542* (2013.01);
(Continued)

(58) Field of Classification Search
CPC .......................... H04L 51/224; H04L 12/1813
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 | 7/2015 |
| CN | 1653829 A | 8/2005 |

(Continued)

OTHER PUBLICATIONS

"U.S. Appl. No. 16/856,811, Non Final Office Action mailed Jun. 9, 2021", 20 pgs.

(Continued)

*Primary Examiner* — Douglas B Blair
(74) *Attorney, Agent, or Firm* — Schwegman Lundberg & Woessner, P.A.

(57) ABSTRACT

A method, to manage an event invitation in a computer network environment, comprises presenting, using one or more processors, an event invitation creation indicium to a first user on a user interface of a computing device. Responsive to user selection of the event invitation creation indicium, an event creation interface is presented to receive event details. Responsive to receipt of the event details, an event invitation message is generated for communication, via a messaging system, by the first user to a second user of the messaging system, the event invitation message including a join indicium that is user-selectable to join a group chat related to the event. Responsive to a message send input from the first user, the event invitation message is sent, via the messaging system, from the first user to the second user. A request is received, from the second user, a request to join the group chat related to the event. A group chat message thread, associated with an event group including at least the first user and the second user, is then stored within the messaging system.

20 Claims, 27 Drawing Sheets

(51) Int. Cl.
  *G06F 9/54* (2006.01)
  *H04L 12/18* (2006.01)
  *H04L 51/224* (2022.01)
  *H04W 4/14* (2009.01)
  *H04W 8/26* (2009.01)

(52) U.S. Cl.
  CPC ........ *H04L 12/1813* (2013.01); *H04L 51/224* (2022.05); *H04W 4/14* (2013.01); *H04W 8/26* (2013.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,681,393 B1 | 1/2004 | Bauminger et al. |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,732,103 B1 | 5/2004 | Strick et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,397,806 B2 | 7/2008 | Burger |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,519,670 B2 | 4/2009 | Jagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,818,415 B2 | 10/2010 | Jhanji |
| 7,856,360 B2 | 12/2010 | Kramer et al. |
| 7,912,896 B2 | 3/2011 | Wolovitz et al. |
| 8,001,204 B2 | 8/2011 | Burtner et al. |
| 8,032,586 B2 | 10/2011 | Challenger et al. |
| 8,065,171 B2 | 11/2011 | Nguyen et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |

(56) References Cited

U.S. PATENT DOCUMENTS

| | | |
|---|---|---|
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B2 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,643,677 B2 | 2/2014 | Suzuki |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| RE45,040 E | 7/2014 | Fish et al. |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,843,835 B1 * | 9/2014 | Busey ................. H04L 63/0421 |
| | | 715/854 |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,933,967 B2 | 1/2015 | Huston et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,118,723 B1 | 8/2015 | Su et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,245,025 B2 | 1/2016 | Chen |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,344,606 B2 | 5/2016 | Hartley et al. |
| 9,356,904 B1 | 5/2016 | Ho |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,495,086 B2 | 11/2016 | May et al. |
| 9,503,873 B1 * | 11/2016 | Yadav ..................... H04W 4/90 |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,628,950 B1 | 4/2017 | Noeth et al. |
| 9,639,561 B2 | 5/2017 | Roberts et al. |
| 9,652,896 B1 | 5/2017 | Jurgenson et al. |
| 9,659,244 B2 | 5/2017 | Anderton et al. |
| 9,681,099 B1 * | 6/2017 | Deets, Jr. ............... G06Q 10/10 |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,817,995 B2 | 11/2017 | Papakipos et al. |
| 9,825,898 B2 | 11/2017 | Sehn |
| 9,854,219 B2 | 12/2017 | Sehn |
| 9,918,193 B1 | 3/2018 | Nguyen et al. |
| 9,961,520 B2 | 5/2018 | Brooks et al. |
| 9,977,510 B1 * | 5/2018 | Moffett ................... G06F 3/017 |
| 9,992,146 B2 | 6/2018 | Fabre et al. |
| 10,037,498 B2 | 7/2018 | Correll et al. |
| 10,049,330 B2 | 8/2018 | Alag et al. |
| 10,395,257 B2 | 8/2019 | Patterson et al. |
| 10,471,341 B1 | 11/2019 | Xu |
| 10,559,107 B1 | 2/2020 | Charlton et al. |
| 10,674,311 B1 | 6/2020 | Bouba et al. |
| 10,686,748 B1 | 6/2020 | Dorsey et al. |
| 10,728,701 B1 | 7/2020 | Chandrasekaran et al. |
| 10,791,077 B2 | 9/2020 | Andreou et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,052,322 B1 | 7/2021 | Wu et al. |
| 11,134,036 B2 | 9/2021 | Taitz et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 11,411,900 B2 | 8/2022 | Boyd et al. |
| 11,418,465 B2 | 8/2022 | Taitz et al. |
| 11,601,613 B1 | 3/2023 | Clark et al. |
| 11,700,225 B2 | 7/2023 | Boyd et al. |
| 11,722,442 B2 | 8/2023 | Taitz et al. |
| 11,727,430 B2 | 8/2023 | Mitchell |
| 11,838,252 B2 | 12/2023 | Andreou et al. |
| 11,921,993 B2 * | 3/2024 | Tyler ................... G06F 3/04883 |
| 11,973,728 B2 | 4/2024 | Taitz et al. |
| 11,973,730 B2 | 4/2024 | Boyd et al. |
| 11,978,127 B2 * | 5/2024 | Elias ................. G06Q 30/0201 |
| 12,069,017 B2 | 8/2024 | Andreou et al. |
| 2002/0047868 A1 | 4/2002 | Miyazawa |
| 2002/0070954 A1 | 6/2002 | Lang |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |

(56) References Cited

U.S. PATENT DOCUMENTS

| | | |
|---|---|---|
| 2002/0144154 A1 | 10/2002 | Tomkow |
| 2002/0156848 A1 | 10/2002 | Grouse |
| 2003/0001846 A1 | 1/2003 | Davis et al. |
| 2003/0012150 A1 | 1/2003 | Chapuran et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0162881 A1 | 8/2004 | Digate et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0267975 A1 | 12/2005 | Qureshi et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198316 A1 | 8/2007 | Boland et al. |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0242131 A1 | 10/2007 | Sanz-Pastor et al. |
| 2007/0243887 A1 | 10/2007 | Bandhole et al. |
| 2007/0244750 A1 | 10/2007 | Grannan et al. |
| 2007/0250366 A1 | 10/2007 | Nurmi |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076453 A1 | 3/2008 | Cal et al. |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0098079 A1 | 4/2008 | Sanghavi |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0162615 A1 | 7/2008 | Hurmola et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1* | 5/2009 | Thomsen ............... H04L 67/34 709/206 |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199230 A1 | 8/2009 | Kumar et al. |
| 2009/0199242 A1 | 8/2009 | Johnson et al. |
| 2009/0215469 A1 | 8/2009 | Fisher et al. |
| 2009/0228322 A1 | 9/2009 | Van Os et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0290690 A1 | 11/2009 | Fan et al. |
| 2009/0291672 A1 | 11/2009 | Treves et al. |

(56) References Cited

U.S. PATENT DOCUMENTS

| | | |
|---|---|---|
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0069104 A1 | 3/2010 | Neil et al. |
| 2010/0082427 A1 | 4/2010 | Burgener et al. |
| 2010/0082513 A1 | 4/2010 | Liu |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131598 A1 | 5/2010 | Ruelas-Arana |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2010/0325220 A1 | 12/2010 | Skinner et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0035678 A1 | 2/2011 | Hamrick et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066363 A1 | 3/2011 | Kimishima |
| 2011/0066743 A1 | 3/2011 | Hurley et al. |
| 2011/0083101 A1 | 4/2011 | Sharon et al. |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0126253 A1 | 5/2011 | Roberts et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0244894 A1 | 10/2011 | Mahalingam |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0312307 A1 | 12/2011 | Gross et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0102123 A1 | 4/2012 | Tysk |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0246679 A1 | 9/2012 | Chen |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0290666 A1 | 11/2012 | Fabre et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2012/0331568 A1 | 12/2012 | Weinstein et al. |
| 2013/0006759 A1 | 1/2013 | Srivastava et al. |
| 2013/0024757 A1 | 1/2013 | Doll et al. |
| 2013/0035995 A1 | 2/2013 | Patterson et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0066963 A1 | 3/2013 | Odio et al. |
| 2013/0067027 A1 | 3/2013 | Song et al. |

(56) References Cited

U.S. PATENT DOCUMENTS

| | | |
|---|---|---|
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0088494 A1* | 4/2013 | Ortiz .................. G06Q 30/02 375/295 |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0144674 A1 | 6/2013 | Kim et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0166385 A1* | 6/2013 | Russell .................. G06Q 50/01 707/706 |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198013 A1 | 8/2013 | Shehan et al. |
| 2013/0198176 A1 | 8/2013 | Kim |
| 2013/0212494 A1 | 8/2013 | Helferman et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0329060 A1 | 12/2013 | Yim |
| 2013/0332856 A1 | 12/2013 | Sanders et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0143434 A1 | 5/2014 | Sanche |
| 2014/0149519 A1 | 5/2014 | Redfern et al. |
| 2014/0155102 A1 | 6/2014 | Cooper et al. |
| 2014/0172856 A1 | 6/2014 | Imbruce et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0244640 A1 | 8/2014 | Mccoy et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0280566 A1 | 9/2014 | Chen et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0379798 A1 | 12/2014 | Bunner et al. |
| 2015/0020086 A1 | 1/2015 | Chen et al. |
| 2015/0046278 A1 | 2/2015 | Pei et al. |
| 2015/0066614 A1 | 3/2015 | Gilmartin et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0170045 A1 | 6/2015 | Kirkham et al. |
| 2015/0172534 A1 | 6/2015 | Miyakawa et al. |
| 2015/0178260 A1 | 6/2015 | Brunson |
| 2015/0180980 A1 | 6/2015 | Welinder et al. |
| 2015/0199082 A1 | 7/2015 | Scholler et al. |
| 2015/0222580 A1 | 8/2015 | Grue |
| 2015/0222814 A1 | 8/2015 | Li et al. |
| 2015/0227602 A1 | 8/2015 | Ramu et al. |
| 2015/0261917 A1 | 9/2015 | Smith |
| 2015/0269531 A1 | 9/2015 | Menayas et al. |
| 2015/0271126 A1 | 9/2015 | Menayas et al. |
| 2015/0271638 A1 | 9/2015 | Menayas et al. |
| 2015/0312184 A1 | 10/2015 | Langholz et al. |
| 2015/0324826 A1 | 11/2015 | Mizushima |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014059 A1 | 1/2016 | Rathod |
| 2016/0014063 A1 | 1/2016 | Hogeg et al. |
| 2016/0034827 A1* | 2/2016 | Morris ................ G06F 3/04842 705/5 |
| 2016/0049008 A1* | 2/2016 | Haddick ............... H04N 9/3161 345/633 |
| 2016/0057156 A1 | 2/2016 | Lin et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0094961 A1 | 3/2016 | Agrawal et al. |
| 2016/0099901 A1 | 4/2016 | Allen et al. |
| 2016/0148158 A1 | 5/2016 | Marth et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0191653 A1 | 6/2016 | Aluotto |
| 2016/0196239 A1 | 7/2016 | Liu et al. |
| 2016/0196584 A1 | 7/2016 | Franklin et al. |
| 2016/0239248 A1 | 8/2016 | Sehn |
| 2016/0253833 A1 | 9/2016 | Lew |
| 2016/0261527 A1 | 9/2016 | Huang |
| 2016/0269675 A1 | 9/2016 | Tsujimoto |
| 2016/0277419 A1 | 9/2016 | Allen et al. |
| 2016/0302037 A1* | 10/2016 | Jack .................... H04W 4/029 |
| 2016/0321708 A1 | 11/2016 | Sehn |
| 2016/0359957 A1 | 12/2016 | Laliberte |

(56) References Cited

U.S. PATENT DOCUMENTS

| | | |
|---|---|---|
| 2016/0359987 A1 | 12/2016 | Laliberte |
| 2017/0006094 A1 | 1/2017 | Abou Mahmoud et al. |
| 2017/0024091 A1 | 1/2017 | Hosier, Jr. |
| 2017/0061308 A1 | 3/2017 | Chen et al. |
| 2017/0104712 A1 | 4/2017 | Cho et al. |
| 2017/0118034 A1* | 4/2017 | Soli ............... H04L 12/1818 |
| 2017/0124606 A1 | 5/2017 | Belle |
| 2017/0149699 A1 | 5/2017 | Hinson, Jr. |
| 2017/0161382 A1 | 6/2017 | Ouimet et al. |
| 2017/0161599 A1 | 6/2017 | Li et al. |
| 2017/0177607 A1 | 6/2017 | Fahey |
| 2017/0221095 A1 | 8/2017 | Gauglitz et al. |
| 2017/0263029 A1 | 9/2017 | Yan et al. |
| 2017/0279751 A1 | 9/2017 | Quirarte et al. |
| 2017/0286994 A1 | 10/2017 | Truong |
| 2017/0287006 A1 | 10/2017 | Azmoodeh et al. |
| 2017/0295250 A1 | 10/2017 | Samaranayake et al. |
| 2017/0301043 A1* | 10/2017 | Soli ............... H04L 51/52 |
| 2017/0351977 A1* | 12/2017 | Bijor ............... G06Q 10/02 |
| 2017/0357950 A1 | 12/2017 | Bennett et al. |
| 2017/0374003 A1 | 12/2017 | Allen et al. |
| 2017/0374508 A1 | 12/2017 | Davis et al. |
| 2018/0013861 A1 | 1/2018 | Howard et al. |
| 2018/0054487 A1 | 2/2018 | Hebsur et al. |
| 2018/0077542 A1* | 3/2018 | Xie ............... H04W 4/12 |
| 2018/0130138 A1* | 5/2018 | Kumar ............... H04L 51/52 |
| 2018/0191831 A1 | 7/2018 | Wadley et al. |
| 2018/0227376 A1 | 8/2018 | Schneider et al. |
| 2018/0241705 A1 | 8/2018 | Sarafa et al. |
| 2018/0246623 A1 | 8/2018 | Peled et al. |
| 2018/0246983 A1 | 8/2018 | Rathod |
| 2018/0253901 A1 | 9/2018 | Charlton et al. |
| 2018/0329622 A1 | 11/2018 | Missig et al. |
| 2018/0332446 A1 | 11/2018 | Seidman |
| 2018/0336644 A1 | 11/2018 | Albertine et al. |
| 2018/0350144 A1* | 12/2018 | Rathod ............... G06Q 20/3224 |
| 2018/0351888 A1 | 12/2018 | Howard |
| 2018/0351895 A1 | 12/2018 | Rathod |
| 2018/0357609 A1 | 12/2018 | Hwacinski et al. |
| 2019/0052587 A1 | 2/2019 | Andreou et al. |
| 2019/0188752 A1 | 6/2019 | Jones |
| 2019/0199907 A1 | 6/2019 | Daulton |
| 2019/0205841 A1 | 7/2019 | Burlin et al. |
| 2019/0287418 A1 | 9/2019 | Rabie |
| 2019/0325561 A1 | 10/2019 | Anilkumar et al. |
| 2019/0333023 A1 | 10/2019 | Foran |
| 2019/0356620 A1 | 11/2019 | Presley et al. |
| 2019/0392399 A1 | 12/2019 | Horne |
| 2020/0104020 A1 | 4/2020 | Grantham et al. |
| 2020/0112450 A1 | 4/2020 | Chhabra et al. |
| 2020/0117339 A1* | 4/2020 | Amitay ............... G06Q 50/01 |
| 2020/0120170 A1 | 4/2020 | Amitay et al. |
| 2020/0177965 A1 | 6/2020 | Fawcett et al. |
| 2020/0184478 A1 | 6/2020 | Peled et al. |
| 2020/0193390 A1 | 6/2020 | Almanza Ahumada et al. |
| 2020/0314586 A1 | 10/2020 | Bouba et al. |
| 2020/0358728 A1 | 11/2020 | Andreou et al. |
| 2020/0382912 A1 | 12/2020 | Dancie et al. |
| 2020/0401225 A1 | 12/2020 | Jaureguiberry et al. |
| 2020/0410453 A1 | 12/2020 | Nalllah et al. |
| 2021/0006519 A1 | 1/2021 | Taitz et al. |
| 2021/0011612 A1 | 1/2021 | Dancie et al. |
| 2021/0042724 A1* | 2/2021 | Rathod ............... G07G 1/0054 |
| 2021/0152979 A1 | 5/2021 | Berardino et al. |
| 2021/0203522 A1 | 7/2021 | Kim et al. |
| 2021/0218571 A1* | 7/2021 | Ansari ............... H04M 15/705 |
| 2021/0226904 A1 | 7/2021 | Taitz et al. |
| 2021/0266704 A1 | 8/2021 | Dancie et al. |
| 2021/0286510 A1* | 9/2021 | Tyler ............... G06F 3/0484 |
| 2021/0306288 A1 | 9/2021 | Boyd et al. |
| 2021/0336916 A1 | 10/2021 | Boyd et al. |
| 2021/0377693 A1 | 12/2021 | Bouba et al. |
| 2021/0409904 A1 | 12/2021 | Baylin et al. |
| 2022/0174455 A1 | 6/2022 | Guillaume |
| 2022/0179665 A1* | 6/2022 | Rathod ............... G06F 9/451 |
| 2022/0269345 A1 | 8/2022 | Jaureguiberry et al. |
| 2022/0321506 A1 | 10/2022 | Taitz et al. |
| 2023/0057193 A1* | 2/2023 | Ansari ............... H04L 67/566 |
| 2023/0318993 A1 | 10/2023 | Taitz et al. |
| 2023/0328014 A1 | 10/2023 | Andreou et al. |
| 2023/0379287 A1 | 11/2023 | Boyd et al. |
| 2023/0396569 A1 | 12/2023 | Boyd et al. |
| 2023/0419566 A1* | 12/2023 | Bliss ............... G01C 21/3874 |
| 2024/0205176 A1 | 6/2024 | Taitz et al. |
| 2024/0223519 A1 | 7/2024 | Boyd et al. |

FOREIGN PATENT DOCUMENTS

| | | |
|---|---|---|
| CN | 1791070 A | 6/2006 |
| CN | 102082740 A | 6/2011 |
| CN | 103457994 A | 12/2013 |
| CN | 103702297 A | 4/2014 |
| CN | 104954402 A | 9/2015 |
| CN | 105378702 A | 3/2016 |
| CN | 106789547 A | 5/2017 |
| CN | 106992921 A | 7/2017 |
| CN | 111133723 A | 5/2020 |
| CN | 115428414 A | 12/2022 |
| CN | 116567556 | 8/2023 |
| DE | 202016008173 U1 | 6/2017 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| KR | 102236593 B1 | 4/2021 |
| KR | 102343824 B1 | 12/2021 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | 2012000107 | 1/2012 |
| WO | 2013008251 | 1/2013 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | 2014194262 | 12/2014 |
| WO | 2015192026 | 12/2015 |
| WO | WO-2016044424 A1 | 3/2016 |
| WO | 2016054562 | 4/2016 |
| WO | 2016065131 | 4/2016 |
| WO | WO-2016100318 A2 | 6/2016 |
| WO | WO-2016100318 A3 | 6/2016 |
| WO | WO-2016100342 A1 | 6/2016 |
| WO | 2016/112299 | 7/2016 |
| WO | WO-2016149594 A1 | 9/2016 |
| WO | 2016179166 | 11/2016 |
| WO | 2016179235 | 11/2016 |
| WO | 2017106529 | 6/2017 |
| WO | 2017176739 | 10/2017 |
| WO | 2017176992 | 10/2017 |
| WO | 2018005644 | 1/2018 |
| WO | WO-2019032703 A1 | 2/2019 |
| WO | 2021216999 | 10/2021 |
| WO | WO-2023235399 A1 | 12/2023 |

OTHER PUBLICATIONS

"International Application Serial No. PCT/US2021/028840, International Search Report mailed Aug. 12, 2021", 3 pgs.

"International Application Serial No. PCT/US2021/028840, Written Opinion mailed Aug. 12, 2021", 4 pgs.

"U.S. Appl. No. 16/856,811, Response filed Sep. 9, 2021 to Non Final Office Action mailed Jun. 9, 2021", 11 pgs.

(56) References Cited

OTHER PUBLICATIONS

"U.S. Appl. No. 16/856,811, Final Office Action mailed Dec. 27, 2021", 21 pgs.
"U.S. Appl. No. 16/856,811, Response filed Apr. 27, 2022 to Final Office Action mailed Dec. 27, 2021", 10 pgs.
"U.S. Appl. No. 16/856,811, Non Final Office Action mailed May 11, 2022", 23 pgs.
"U.S. Appl. No. 17/222,247, Corrected Notice of Allowability mailed Jul. 7, 2022", 2 pgs.
"U.S. Appl. No. 16/942,061, Response filed Sep. 23, 2022 to Non Final Office Action mailed May 26, 2022", 9 pgs.
"U.S. Appl. No. 16/942,061, Final Office Action mailed Jan. 5, 2023", 19 pgs.
"U.S. Appl. No. 17/843,858, Non Final Office Action mailed Jan. 5, 2023", 8 pgs.
"U.S. Appl. No. 17/843,858, Response filed Feb. 22, 2023 to Non Final Office Action mailed Jan. 5, 2023", 7 pgs.
"U.S. Appl. No. 16/942,061, Response filed Mar. 3, 2023 to Final Office Action mailed Jan. 5, 2023", 10 pgs.
"U.S. Appl. No. 17/843,858, Notice of Allowance mailed Mar. 17, 2023", 11 pgs.
"U.S. Appl. No. 16/942,061, Notice of Allowance mailed Mar. 30, 2023", 5 pgs.
Castelluccia, Claude, "EphPub: Toward robust Ephemeral Publishing", 19th IEEE International Conference on Network Protocols (ICNP), (Oct. 17, 2011), 18 pgs.
Christensson, Per, "Link Definition", TechTerms.com, [Online] Retrieved from the internet: < https://techterms.com/definition/link>, (Jun. 13, 2017), 2 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
"U.S. Appl. No. 15/859,237, Final Office Action mailed Sep. 6, 2019", 12 pgs.
"U.S. Appl. No. 15/859,237, Non Final Office Action mailed Mar. 28, 2019", 11 pgs.
"U.S. Appl. No. 15/859,237, Notice of Allowability mailed Sep. 2, 2020", 2 pgs.
"U.S. Appl. No. 15/859,237, Notice of Allowance mailed Apr. 22, 2020", 5 pgs.
"U.S. Appl. No. 15/859,237, Response filed Feb. 3, 2020 to Final Office Action mailed Sep. 6, 2019", 9 pgs.
"U.S. Appl. No. 15/859,237, Response filed Aug. 28, 2019 to Non Final Office Action mailed Mar. 28, 2019", 9 pgs.
"U.S. Appl. No. 15/859,237, Supplemental Notice of Allowability mailed May 14, 2020", 2 pgs.
"U.S. Appl. No. 16/503,783, Corrected Notice of Allowability mailed Sep. 2, 2021", 2 pgs.
"U.S. Appl. No. 16/503,783, Non Final Office Action mailed Oct. 16, 2020", 16 pgs.
"U.S. Appl. No. 16/503,783, Notice of Allowance mailed Jan. 11, 2021", 11 pgs.
"U.S. Appl. No. 16/503,783, Notice of Allowance mailed May 27, 2021", 5 pgs.
"U.S. Appl. No. 16/503,783, Response filed Dec. 21, 2020 to Non Final Office Action mailed Oct. 16, 2020", 12 pgs.
"U.S. Appl. No. 16/835,080, 312 Amendment filed May 9, 2022", 8 pgs.
"U.S. Appl. No. 16/835,080, Corrected Notice of Allowability mailed Jul. 6, 2022", 2 pgs.
"U.S. Appl. No. 16/835,080, Examiner Interview Summary mailed Jan. 11, 2022", 3 pgs.
"U.S. Appl. No. 16/835,080, Non Final Office Action mailed Oct. 8, 2021", 12 pgs.
"U.S. Appl. No. 16/835,080, Notice of Allowance mailed Feb. 9, 2022", 9 pgs.
"U.S. Appl. No. 16/835,080, PTO Response to Rule 312 Communication mailed May 16, 2022", 2 pgs.
"U.S. Appl. No. 16/835,080, Response filed Jan. 10, 2022 to Non Final Office Action mailed Oct. 8, 2021", 12 pgs.
"U.S. Appl. No. 16/942,061, Non Final Office Action mailed May 26, 2022", 16 pgs.
"U.S. Appl. No. 16/942,061, Preliminary Amendment filed Aug. 31, 2020", 7 pgs.
"U.S. Appl. No. 17/222,247, Non Final Office Action mailed Jan. 5, 2022", 9 pgs.
"U.S. Appl. No. 17/222,247, Notice of Allowance mailed Apr. 12, 2022", 11 pgs.
"U.S. Appl. No. 17/222,247, Response filed Mar. 22, 2022 to Non Final Office Action mailed Jan. 5, 2022", 7 pgs.
"Chinese Application Serial No. 201880057966.5, Response filed May 7, 2022 to Office Action mailed Feb. 22, 2022", w/ English Claims, 9 pgs.
"Chinese Application Serial No. 201880057966.5, Office Action mailed Feb. 22, 2022", w/ English translation, 12 pgs.
"Chinese Application Serial No. 201880057966.5, Office Action mailed Jun. 28, 2021", w/ English Translation, 14 pgs.
"Chinese Application Serial No. 201880057966.5, Response filed Nov. 12, 2021 to Office Action mailed Jun. 28, 2021", w/English Claims, 13 pgs.
"European Application Serial No. 18842992.2, Communication Pursuant to Article 94(3) EPC mailed Aug. 4, 2021", 10 pgs.
"European Application Serial No. 18842992.2, Extended European Search Report mailed Jul. 20, 2020", 10 pgs.
"International Application Serial No. PCT/US2018/045815, International Preliminary Report on Patentability mailed Feb. 20, 2020", 9 pgs.
"International Application Serial No. PCT/US2018/045815, International Search Report mailed Nov. 28, 2018", 3 pgs.
"International Application Serial No. PCT/US2018/045815, Written Opinion mailed Nov. 28, 2018", 7 pgs.
"Korean Application Serial No. 10-2020-7006769, Notice of Preliminary Rejection mailed Apr. 2, 2021", w/ English Translation, 10 pgs.
"Korean Application Serial No. 10-2020-7006769, Response filed Jul. 8, 2021 to Notice of Preliminary Rejection mailed Apr. 2, 2021", w/ English Claims, 18 pgs.
"Surprise!", [Online] Retrieved from the Internet: <URL: https://www.snap.com/en-Us/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
U.S. Appl. No. 18/204,203, filed May 31, 2023, Application-Independent Messaging System.

(56) References Cited

OTHER PUBLICATIONS

U.S. Appl. No. 18/205,246, filed Jun. 2, 2023, Event Planning in a Content Sharing Platform.
U.S. Appl. No. 18/132,267, filed Apr. 7, 2023, External Messaging Function for an Interaction System.
"Chinese Application Serial No. 201880057966.5, Decision of Rejection mailed Aug. 12, 2022", w/ English Translation, 14 pgs.
"Chinese Application Serial No. 201880057966.5, Response filed Nov. 7, 2022 to Decision of Rejection mailed Aug. 12, 2022" w/ English Claims, 12 pgs.
"European Application Serial No. 18842992.2, Communication Pursuant to Article 94(3) EPC mailed Sep. 28, 2023", 13 pgs.
"U.S. Appl. No. 16/942,061, Corrected Notice of Allowability mailed Oct. 25, 2023", 2 pgs.
"U.S. Appl. No. 18/205,246, Non Final Office Action mailed Oct. 27, 2023", 17 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 16/942,061, Corrected Notice of Allowability mailed Sep. 1, 2023", 2 pgs.
"U.S. Appl. No. 16/942,061, Notice of Allowability mailed Apr. 12, 2023", 2 pgs.
"U.S. Appl. No. 18/132,267, Non Final Office Action mailed Sep. 14, 2023", 12 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2023/024011, International Search Report mailed Sep. 25, 2023", 4 pgs.
"International Application Serial No. PCT/US2023/024011, Written Opinion mailed Sep. 25, 2023", 3 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"U.S. Appl. No. 18/132,267, Notice of Allowance mailed Dec. 27, 2023", 8 pgs.
"U.S. Appl. No. 18/132,267, Response filed Dec. 7, 2023 to Non Final Office Action mailed Sep. 14, 2023", 12 pgs.
"U.S. Appl. No. 18/204,203, Notice of Allowability mailed Dec. 20, 2023", 2 pgs.
"U.S. Appl. No. 18/204,203, Notice of Allowance mailed Nov. 15, 2023", 10 pgs.
"U.S. Appl. No. 18/205,246, Notice of Allowance mailed Dec. 27, 2023", 8 pgs.
"U.S. Appl. No. 18/205,246, Response filed Nov. 3, 2023 to Non Final Office Action mailed Oct. 27, 2023", 8 pgs.
U.S. Appl. No. 15/859,237 U.S. Pat. No. 10,791,077, filed Dec. 29, 2017, Application-Independent Messaging System.
U.S. Appl. No. 18/590,706, filed Feb. 28, 2024, Event Planning in a Content Sharing platform.
U.S. Appl. No. 18/608,763, filed Mar. 18, 2024, External Messaging Function for an Interaction System.
US 11,943,183, 03/2024, Andreou, Jacob, et al. (withdrawn)
"U.S. Appl. No. 18/132,267, Corrected Notice of Allowability mailed Apr. 2, 2024", 2 pgs.
"U.S. Appl. No. 18/204,203, Notice of Allowance mailed Apr. 11, 2024", 5 pgs.
"U.S. Appl. No. 16/856,811, Corrected Notice of Allowability mailed Jun. 2, 2023", 3 pgs.
"U.S. Appl. No. 16/856,811, Examiner Interview Summary mailed Jan. 31, 2023", 2 pgs.
"U.S. Appl. No. 16/856,811, Final Office Action mailed Nov. 21, 2022", 25 pgs.
"U.S. Appl. No. 16/856,811, Notice of Allowance mailed Feb. 22, 2023", 9 pgs.
"U.S. Appl. No. 16/856,811, Response filed Jan. 31, 2023 to Final Office Action mailed Nov. 21, 2022", 11 pgs.
"U.S. Appl. No. 16/856,811, Response filed Aug. 11, 2022 to Non Final Office Action mailed May 11, 2022", 10 pgs.
"U.S. Appl. No. 18/321,611, Non Final Office Action mailed Feb. 27, 2024", 7 pgs.
"U.S. Appl. No. 18/321,611, Notice of Allowance mailed Jun. 20, 2024", 7 pgs.
"U.S. Appl. No. 18/321,611, Response filed May 28, 2024 to Non Final Office Action mailed Feb. 27, 2024", 8 pgs.
"U.S. Appl. No. 18/590,706, Notice of Allowance mailed Sep. 26, 2024", 11 pgs.

(56) References Cited

OTHER PUBLICATIONS

"Chinese Application Serial No. 202180030390.5, Office Action mailed Feb. 1, 2024", w/ English Translation, 19 pgs.
"Chinese Application Serial No. 202180030390.5, Response filed Jul. 1, 2024 to Office Action (mailed Feb. 1, 2024", W/English Claims, 16 pgs.
"European Application Serial No. 21792218.6, Extended European Search Report mailed Apr. 2, 2024", 7 pgs.
"International Application Serial No. PCT/US2021/028840, International Preliminary Report on Patentability mailed Nov. 3, 2022", 6 pgs.
U.S. Appl. No. 18/903,829, filed Oct. 1, 2024.
U.S. Appl. No. 16/856,811, filed Apr. 23, 2020.
U.S. Appl. No. 18/321,611, filed May 22, 2023.

* cited by examiner

USER INTERFACE

OFF-PLATFORM MESSAGING SYSTEM

CROSS-REFERENCE TO RELATED APPLICATION

This application is a continuation of U.S. patent application Ser. No. 16/835,080, filed Mar. 30, 2020, which is incorporated by reference herein in its entirety.

BACKGROUND

Current solutions to the organization of group events suffer from a number of shortcomings, particularly with respect to negative inferences that a group of invited attendees may make with respect to the lack of response by other invitees and also the commitment required, sometimes on short notice, about whether to attend an event or not. Furthermore, communications related to an event are not easily facilitated. Solutions to these issues present a number of technical challenges that are not easily addressed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
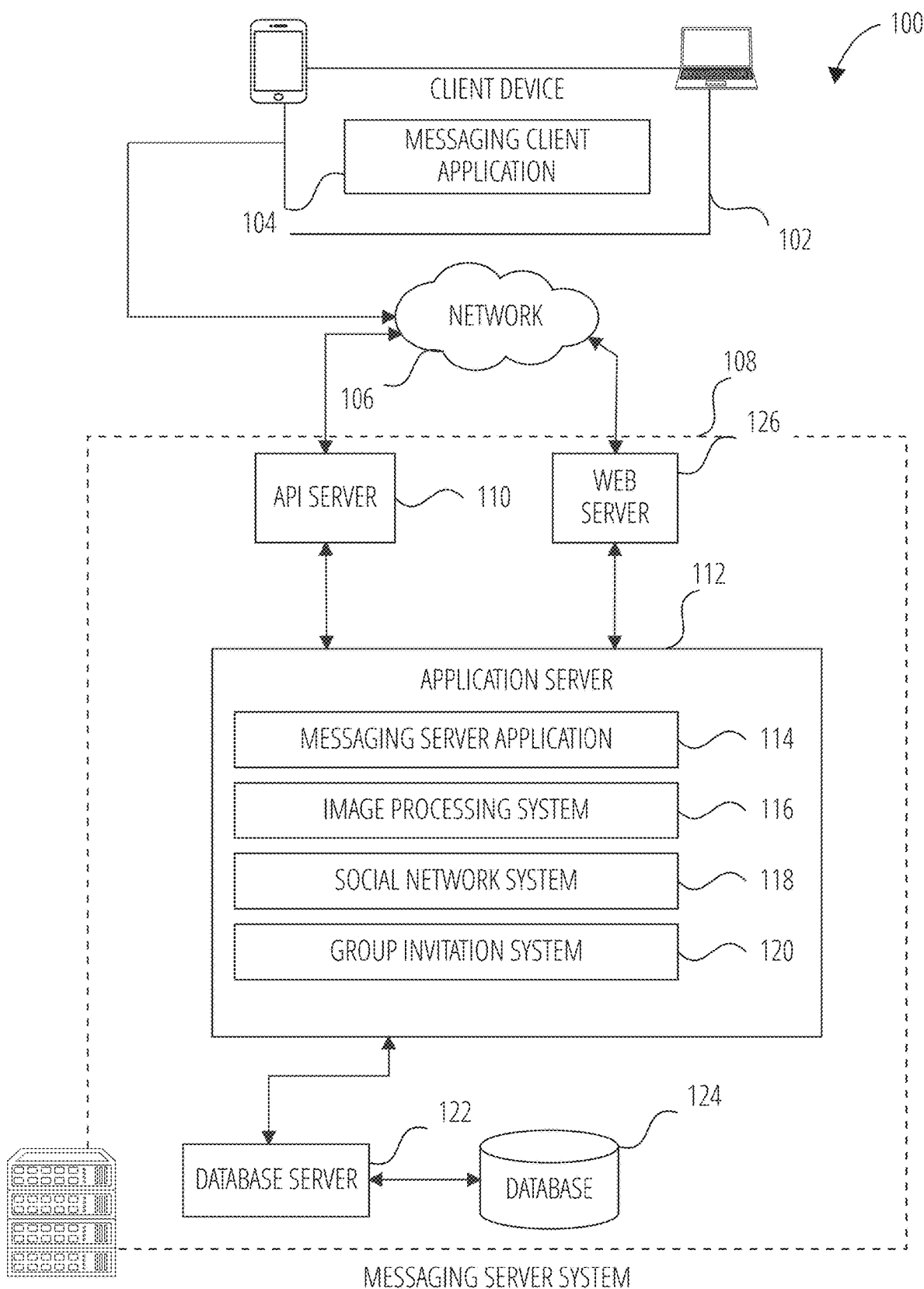
FIG. 1 is a diagrammatic representation of a networked environment in which the present disclosure may be deployed, in accordance with some examples.

Planning for an event using current digital solutions presents a number of logistical and technical challenges. Such solutions, such as Eventbrite, Meetup and Facebook events are typically geared towards larger public or professional events, and may be intimidating for users seeking to plan medium-size parties and events, or even more intimate smaller events. Example problems that are not addressed by current solutions include logistics for getting the correct group of people together. For example, social anxiety comes along with choosing new combinations of people for a new group, while using an existing group may unnecessarily limit attendees.

Further, when organizing events, important details (e.g., location) and information are not surfaced, and users may not be appropriately updated regarding changes.

There is also social anxiety and a "groupthink" aspect to responding to event invitations—e.g.; no one responds because no one else has yet responded.

According to some examples, there is provided a messaging system that supports opt-in messaging groups, with the messaging groups having event-specific features provided by a group invitation system that forms part of the messaging system. The event-specific features supported by the group invitation system may include convenient event invitation creation, the sharing of such event invitations within the context of the messaging system, but also externally to persons who may not be currently registered users of the messaging system, and the user-friendly presentation of details of an event to a user with a convenient mechanism for joining an opt-in group chat pertaining to the event.

The example group invitation system seeks to bring the "right" people together for an event, by enabling them to invite their friends to an opt-in group, thus allowing the invitation to be communicated to people across different social circles. Further, by presenting the invitations as an invitation to join a group chat related to an event (as opposed to an invitation to the event directly), the group invitation system supports a convenient way to involve people in a discussion regarding an event without requiring the immediate commitment of attending the event. By facilitating social engagement within the context of a group chat relating to an event, users can decide about whether to attend the event in a less pressured and more natural manner.

The example group invitation system also enables the simple and casual creation of invitations that can be as simple or as detailed as a creator requires and also enables a user to share an invitation in a one-to-one chat, or a one-to-many message. Further, by enabling an inviting user to personalize an invitation using creative tools (e.g., provided by the annotation system 306 described herein), an invited user is encouraged to respond.

The format of certain invitations supported by the example group invitation system may furthermore selectively display a number of persons that have joined a group chat pertaining to the event, while not displaying a number of persons that have been invited to the group chat. In this way, an invited user is not influenced in his or her decision to respond by a perceived degree of response by other users.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 122, which facilitates access to a database 124 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

A web server 126 receives and transmits interface and message data between the client device 102 and the application server 112. The web server 126 operates to generate and communicate the web pages, as examples of interfaces, described herein.

The application server 112 hosts a number of applications and subsystems, including a messaging server application 114, an image processing system 116, a social network system 118 and a group invitation system 120. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Some processor and memory intensive processing of data may also be performed server-side by the messaging server application 114, in view of the hardware requirements for such processing.

The image processing system 116 performs various image processing operations, typically with respect to images or video received within the payload of a message at the messaging server application 114.

Figure 4:
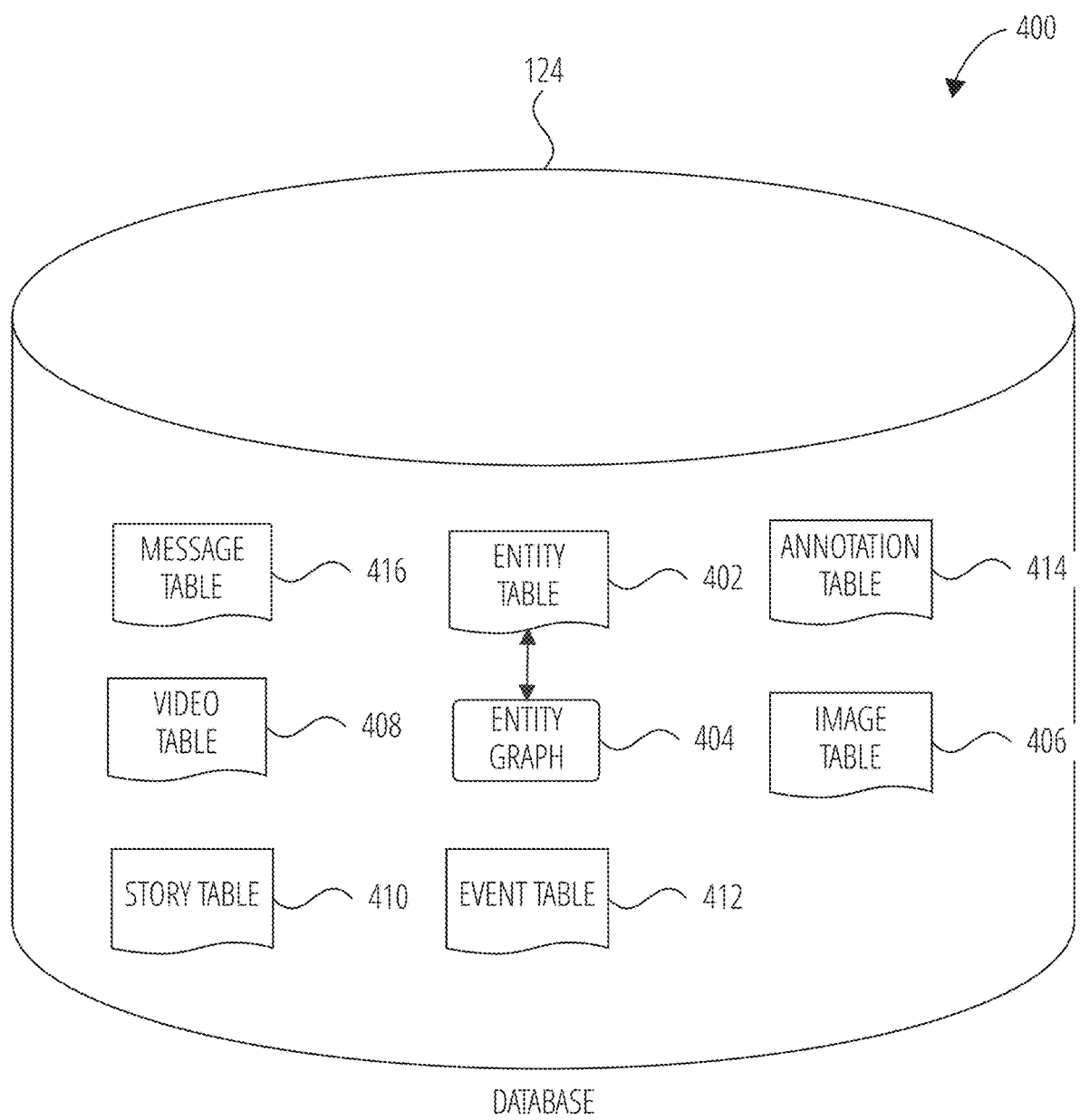
FIG. 4 is a diagrammatic representation of a data structure as maintained in a database, in accordance with some examples.

The social network system 118 supports various social networking functions services, and makes these functions and services available to the messaging server application 114. To this end, the social network system 118 maintains and accesses an entity graph 404 (as shown in FIG. 4) within the database 124. Examples of functions and services supported by the social network system 118 include the identification of other users of the messaging system 100 with which a particular user has relationships or is "following", and also the identification of other entities and interests of a particular user.

The group invitation system 120 is tightly integrated with the messaging server application 114, and facilitates the creation distribution and processing of responses to invitations to group chats pertaining to events. Further details and examples of various functions supported by the group invitation system 120 are discussed below.

The application server 112 is communicatively coupled to a database server 122, which facilitates access to a database 124 in which is stored data associated with messages processed by the messaging server application 114.

Figure 2:
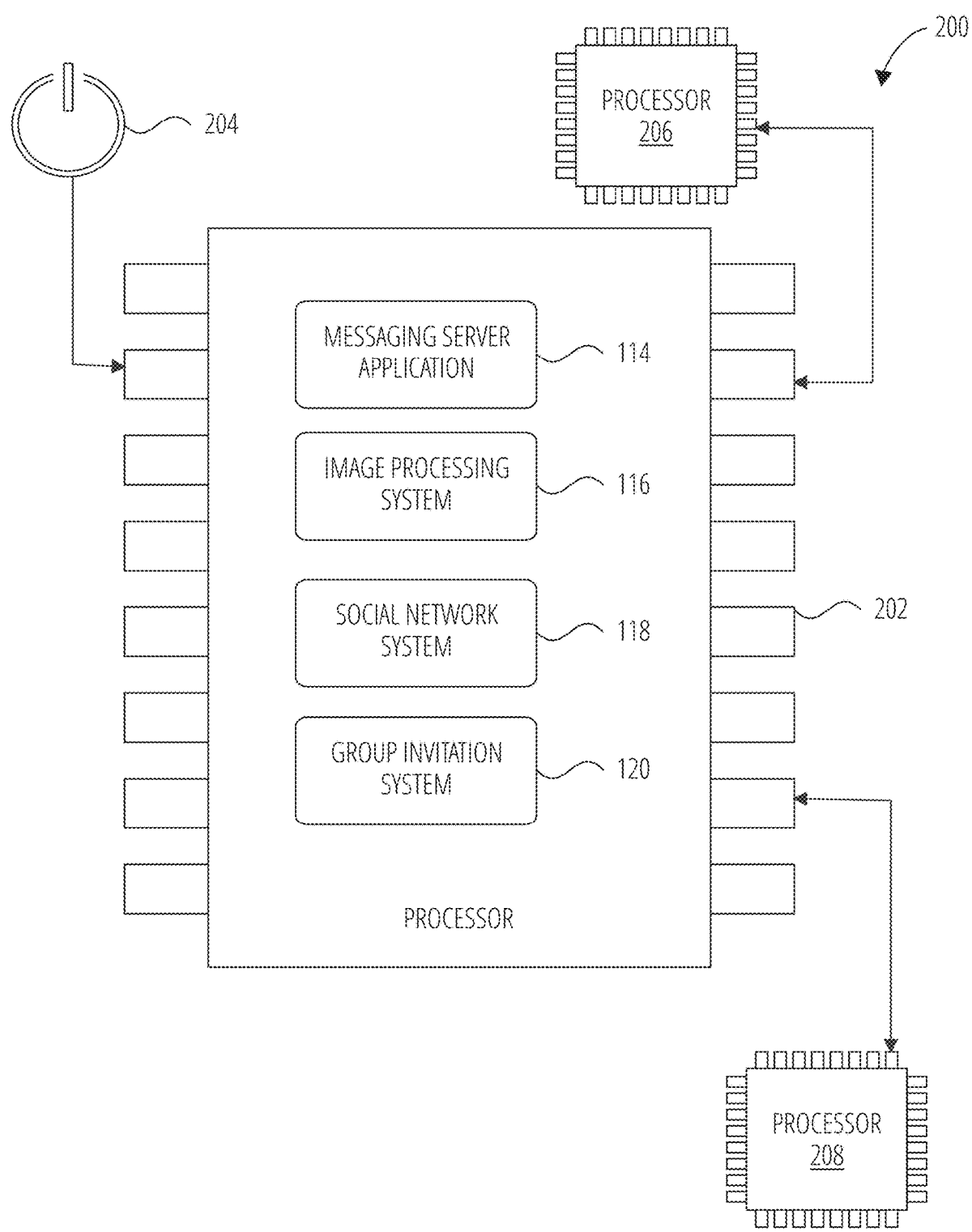
FIG. 2 is a diagrammatic representation of a processing environment, in accordance with some examples.

Turning now to FIG. 2, there is shown a diagrammatic representation of a processing environment 200, which includes a collection of processors including for example processor 202, processor 206 and processor 206 (e.g., a GPU, CPU or combination thereof).

The processor 202 is shown to be coupled to a power source 204, and to include (either permanently configured or temporarily instantiated) modules, namely a messaging server application 114, an image processing system 116, a social network system 118 and a screenshot group invitation system 120. As illustrated, the processor 202 is communicatively coupled to both the processor 206 and processor 208, and receives data from the processor 206 and the processor 208.

Figure 3:
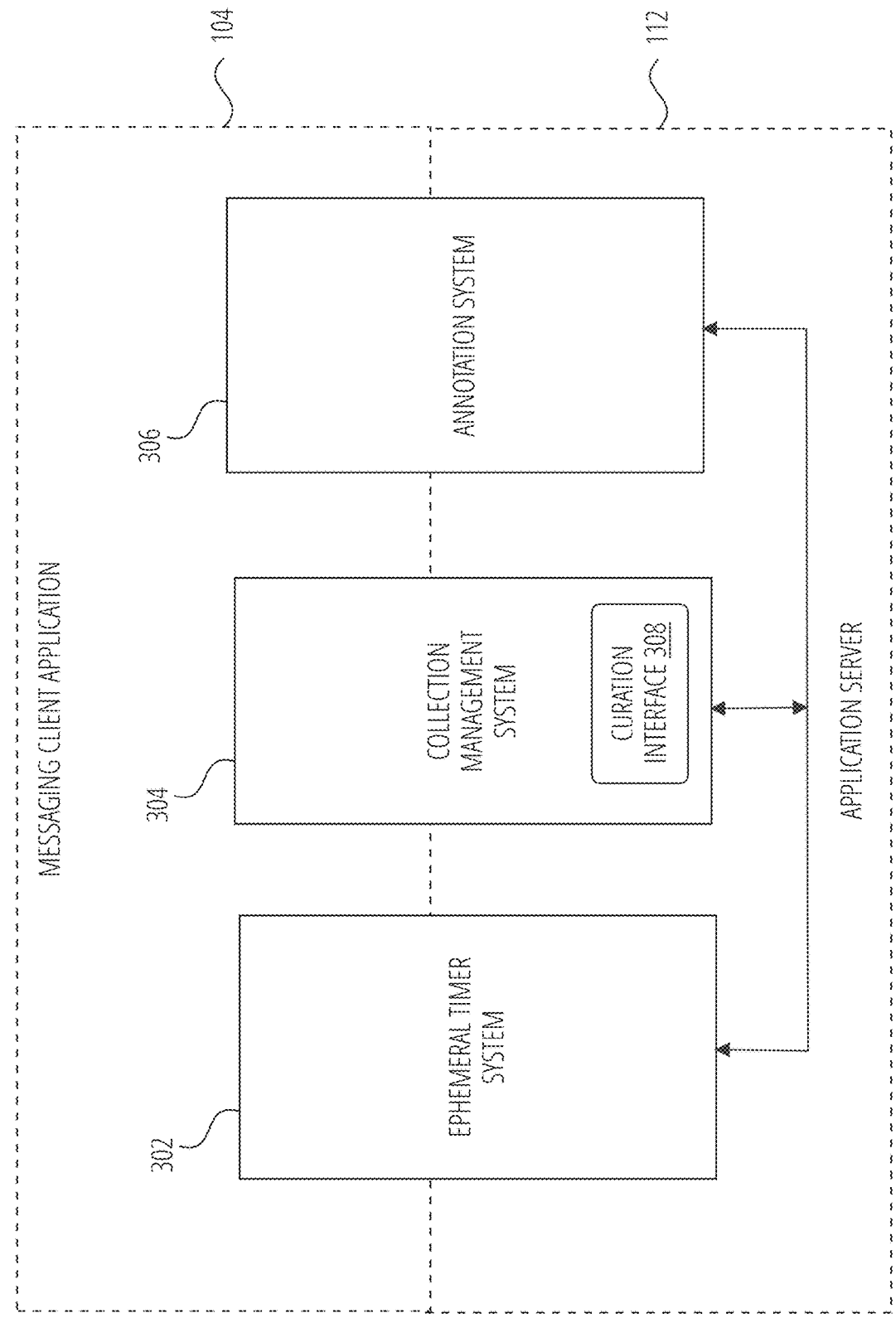
FIG. 3 is a diagrammatic representation of a messaging client application, in accordance with some examples.

FIG. 3 is a block diagram illustrating further details regarding the messaging system 100, according to examples. Specifically, the messaging system 100 is shown to comprise the messaging client application 104 and the application server 112, which in turn embodies a number of some subsystems, namely an ephemeral timer system 302, a collection management system 304 and an annotation system 306.

The ephemeral timer system 302 is responsible for enforcing the temporary access to content permitted by the messaging client application 104 and the messaging server application 114. To this end, the ephemeral timer system 302 incorporates a number of timers that, based on duration and display parameters associated with a message, or collection of messages (e.g., a story), selectively display and enable access to messages and associated content via the messaging client application 104. Further details regarding the operation of the ephemeral timer system 302 are provided below.

The collection management system 304 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 304 may also be responsible for publishing an icon that provides notification of the existence of a particular collection to the user interface of the messaging client application 104.

The collection management system 304 furthermore includes a curation interface 308 that allows a collection manager to manage and curate a particular collection of content. For example, the curation interface 308 enables an event organizer to curate a collection of content relating to a specific event (e.g., delete inappropriate content or redundant messages). Additionally, the collection management system 304 employs machine vision (or image recognition technology) and content rules to automatically curate a content collection. In certain embodiments, compensation may be paid to a user for inclusion of user-generated content into a collection. In such cases, the curation interface 308 operates to automatically make payments to such users for the use of their content.

The annotation system 306 provides various functions that enable a user to annotate or otherwise modify or edit media content associated with a message. For example, the annotation system 306 provides functions related to the generation and publishing of media overlays for messages processed by the messaging system 100. The annotation system 306 operatively supplies a media overlay or supplementation (e.g., an image filter) to the messaging client application 104 based on a geolocation of the client device 102. In another example, the annotation system 306 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 306 uses the geolocation of the client device 102 to identify a media overlay that includes the name of a merchant at the geolocation of the client device 102. The media overlay may include other indicia associated with the merchant. The media overlays may be stored in the database 124 and accessed through the database server 122.

In one example embodiment, the annotation system 306 provides a user-based publication platform that enables users to select a geolocation on a map, and upload content associated with the selected geolocation. The user may also specify circumstances under which a particular media overlay should be offered to other users. The annotation system 306 generates a media overlay that includes the uploaded content and associates the uploaded content with the selected geolocation.

In another example embodiment, the annotation system 306 provides a merchant-based publication platform that enables merchants to select a particular media overlay associated with a geolocation via a bidding process. For example, the annotation system 306 associates the media overlay of a highest bidding merchant with a corresponding geolocation for a predefined amount of time.

FIG. 4 is a schematic diagram illustrating data structures 400 which may be stored in the database 124 of the messaging server system 108, according to certain examples. While the content of the database 124 is shown to comprise a number of tables, it will be appreciated that the data could be stored in other types of data structures (e.g., as an object-oriented database).

The database 124 includes message data stored within a message table 416. The entity table 402 stores entity data, including an entity graph 404. Entities for which records are maintained within the entity table 402 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 404 furthermore stores information regarding relationships and associations between entities. Such relationships may be social, professional (e.g., work at a common corporation or organization) interested-based or activity-based, merely for example.

The database 124 also stores annotation data, in the example form of filters, in an annotation table 414. Filters for which data is stored within the annotation table 414 are associated with and applied to videos (for which data is stored in a video table 408) and/or images (for which data is stored in an image table 406). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 406 is so-called "lens" data. A "lens" may be a real-time special effect and sound that may be added to an image or a video.

As mentioned above, the video table 408 stores video data which, in some examples, is associated with messages for which records are maintained within the message table 416. Similarly, the image table 406 stores image data associated with messages for which message data is stored in the entity table 402. The entity table 402 may associate various annotations from the annotation table 414 with various images and videos stored in the image table 406 and the video table 408.

A story table 410 stores data regarding collections of messages and associated image, video, or audio data, which are compiled into a collection (e.g., a story or a gallery). The creation of a particular collection may be initiated by a particular user (e.g., each user for which a record is maintained in the entity table 402). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 5:
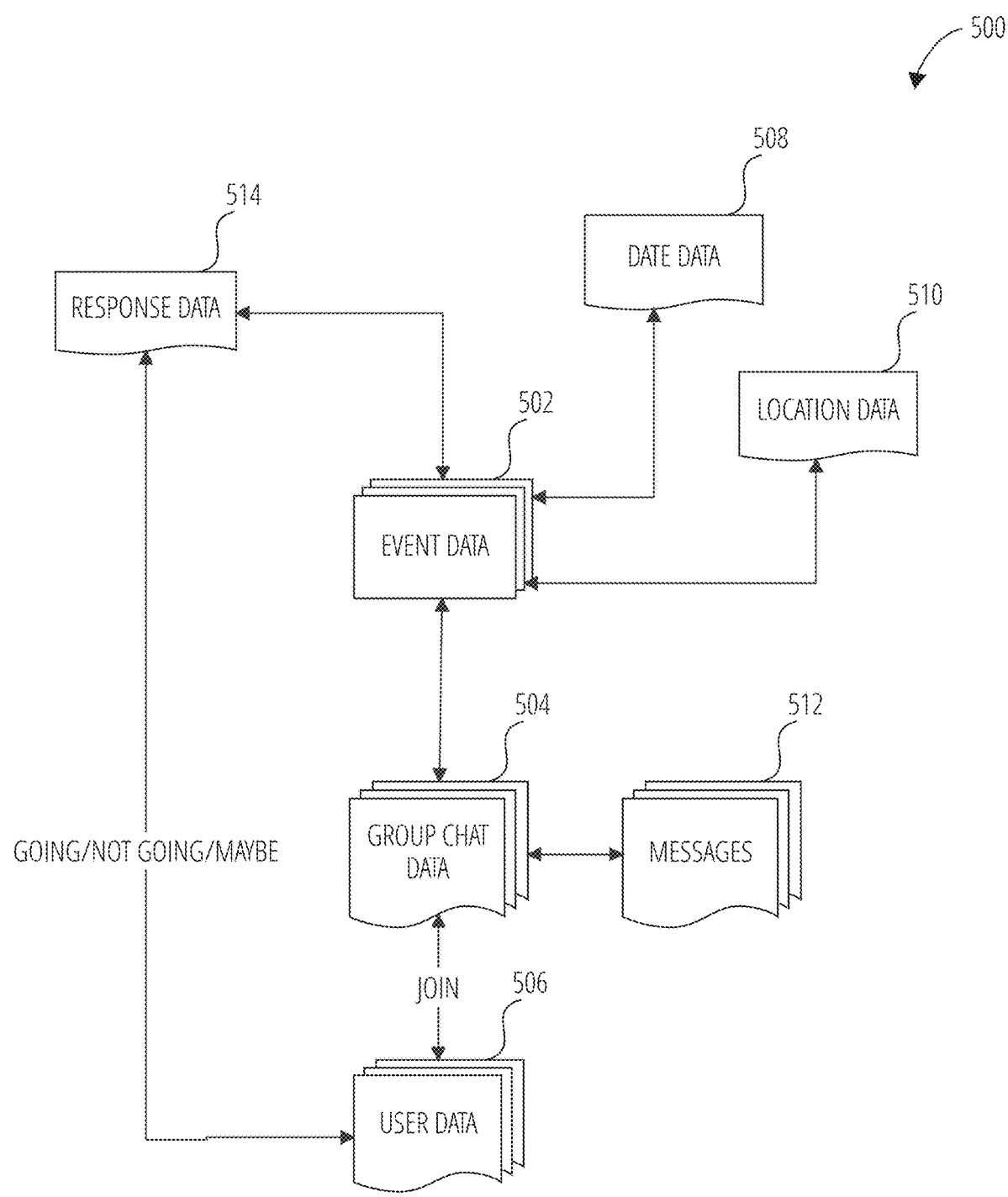
FIG. 5 illustrates a data structure 500 in accordance with some examples.

An event table 412 stores event data, further details of which are provided with reference to FIG. 5.

FIG. 5 is a schematic diagram illustrating a data structure 500 that, in some examples, is maintained by the group messaging system 120. The data structure 500 may be maintained within the tables of the database 124, described with reference to FIG. 4.

The data structure 500 includes event data 502 pertaining to a particular event (e.g., a birthday or other social event), the event data 502 including date data 508 (e.g., a date and time of the relevant event), and location data 510 (e.g., the GPS coordinates of an event location, or an identifier of a building or place at which an event is being hosted). In various embodiments, additional event data 502 may be stored. The event data 502 may further be stored in the event table 412 shown in FIG. 4

Each instance of event data 502 is linked to group chat data 504, which associates a group chat identifier with a number of messages 512 (e.g., stored in the message table 416) that form part of the group chat, as well as user data 506(e.g., stored in the entity table 402) identifying users that are members of the relevant group chat by having joined or opted in to the group chat. Members of the group chat may contribute messages 512 to the relevant group chat.

Furthermore, the event data 502 may include a response data 514, indicating whether users are attending the relevant event. In some examples, an invitation associated with an event may solicit one of a group of responses from an invited user, the responses including "going", "not going" or "maybe going." These responses are associated with users identified within the user data 506, as shown in FIG. 5.

Figure 6:
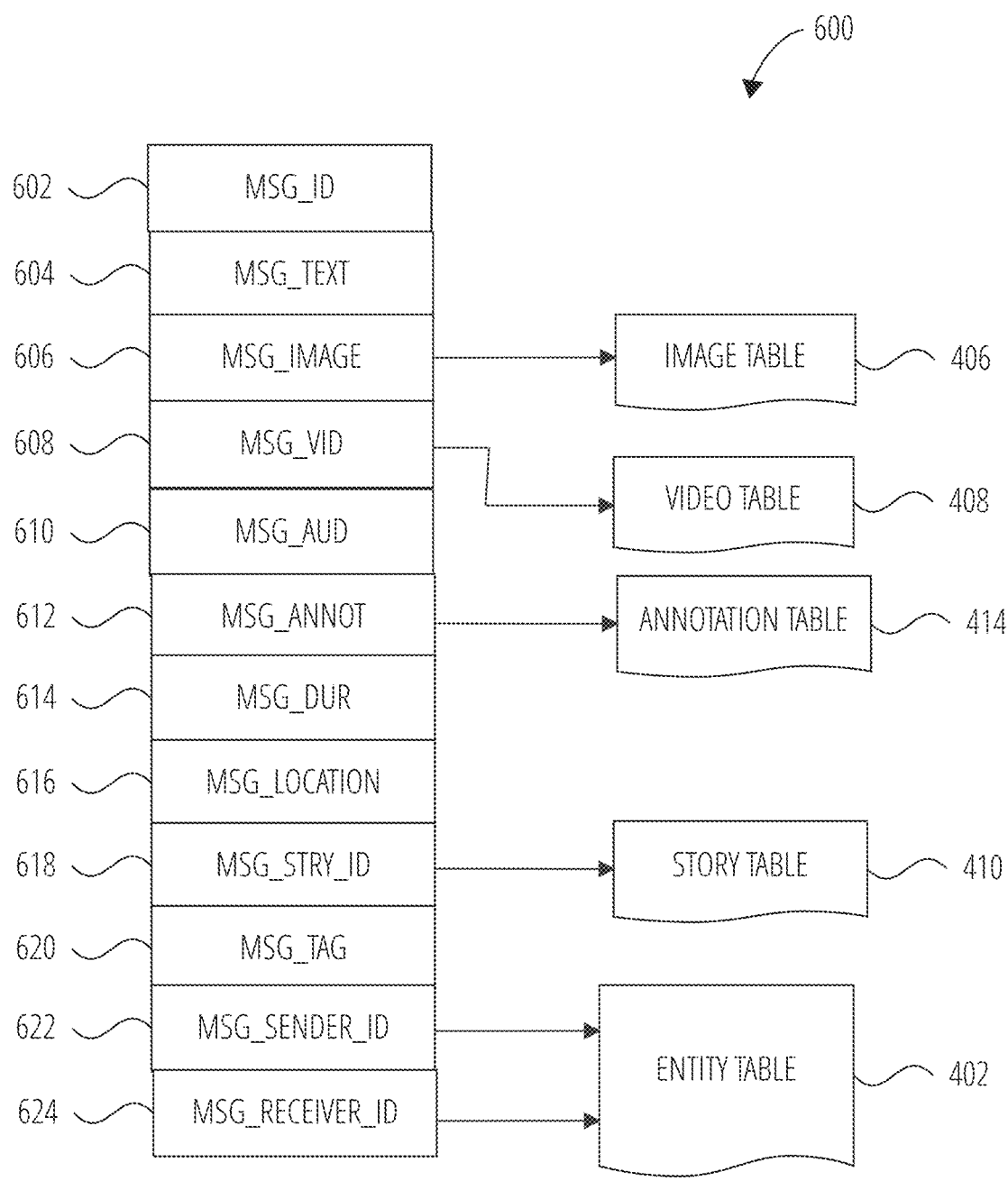
FIG. 6 is a diagrammatic representation of a message, in accordance with some examples.

FIG. 6 is a schematic diagram illustrating a structure of a message 600, according to some in some embodiments, generated by a messaging client application 104 for communication to a further messaging client application 104 or the messaging server application 114. The content of a particular message 600 is used to populate the message table 416 stored within the database 124, accessible by the messaging server application 114. Similarly, the content of a message 600 is stored in memory as "in-transit" or "in-flight" data of the client device 102 or the application server 112. The message 600 is shown to include the following components:

1. A message identifier 602: a unique identifier that identifies the message 600.
2. A message text payload 604: text, to be generated by a user via a user interface of the client device 102, and that is included in the message 600.
3. A message image payload 606: image data, captured by a camera component of a client device 102 or retrieved from a memory component of a client device 102, and that is included in the message 600.
4. A message video payload 608: video data, captured by a camera component or retrieved from a memory component of the client device 102, and that is included in the message 600.

5. A message audio payload 610: audio data, captured by a microphone or retrieved from a memory component of the client device 102, and that is included in the message 600.
6. A message annotation 512: annotation data (e.g., filters, stickers or other enhancements) that represents annotations to be applied to message image payload 606, message video payload 608, or message audio payload 610 of the message 600.
7. A message duration parameter 614: parameter value indicating, in seconds, the amount of time for which content of the message (e.g., the message image payload 606, message video payload 608, message audio payload 610) is to be presented or made accessible to a user via the messaging client application 104.
8. A message geolocation parameter 616: geolocation data (e.g., latitudinal and longitudinal coordinates) associated with the content payload of the message. Multiple message geolocation parameter 616 values may be included in the payload, each of these parameter values being associated with respect to content items included in the content (e.g., a specific image into within the message image payload 606, or a specific video in the message video payload 608).
9. A message story identifier 618: identifier values identifying one or more content collections (e.g., "stories") with which a particular content item in the message image payload 606 of the message 600 is associated. For example, multiple images within the message image payload 606 may each be associated with multiple content collections using identifier values.
10. A message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.
11. A message sender identifier 622: an identifier (e.g., a messaging system identifier, email address, or device identifier) indicative of a user of the client device 102 on which the message 600 was generated and from which the message 600 was sent.
12. A message receiver identifier 624: an identifier (e.g., a messaging system identifier, email address, or device identifier) indicative of a user of the client device 102 to which the message 600 is addressed.

The contents (e.g., values) of the various components of message 600 may be pointers to locations in tables within which content data values are stored. For example, an image value in the message image payload 606 may be a pointer to (or address of) a location within an image table 406. Similarly, values within the message video payload 608 may point to data stored within a video table 408, values stored within the message annotations 612 may point to data stored in an annotation table 414, values stored within the message story identifier 618 may point to data stored in a story table 410, and values stored within the message sender identifier 622 and the message receiver identifier 624 may point to user records stored within an entity table 402.

Figure 7:
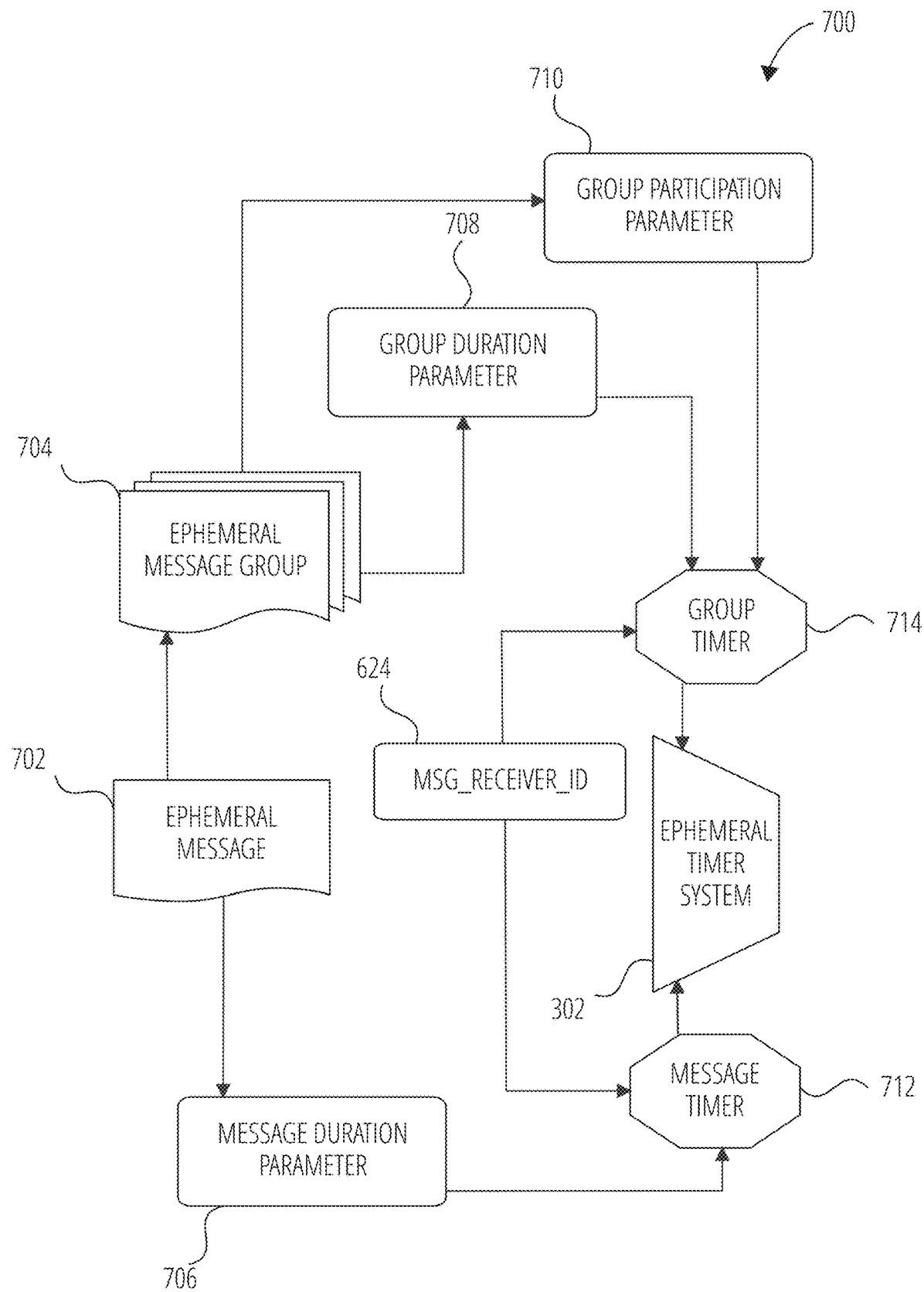
FIG. 7 is a flowchart for an access-limiting process, in accordance with some examples.

FIG. 7 is a schematic diagram illustrating an access-limiting process 700, in terms of which access to content (e.g., an ephemeral message 702, and associated multimedia payload of data) or a content collection (e.g., an ephemeral message group 704) may be time-limited (e.g., made ephemeral).

An ephemeral message 702 is shown to be associated with a message duration parameter 706, the value of which determines an amount of time that the ephemeral message 702 will be displayed to a receiving user of the ephemeral message 702 by the messaging client application 104. In some examples, an ephemeral message 702 is viewable by a receiving user for up to a maximum of 10 seconds, depending on the amount of time that the sending user specifies using the message duration parameter 706.

The message duration parameter 706 and the message receiver identifier 624 are shown to be inputs to a message timer 712, which is responsible for determining the amount of time that the Ephemeral message 702 is shown to a particular receiving user identified by the message receiver identifier 624. In particular, the ephemeral message 702 will be shown to the relevant receiving user for a time period determined by the value of the message duration parameter 706. The message timer 712 is shown to provide output to a more generalized ephemeral timer system 302, which is responsible for the overall timing of display of content (e.g., an ephemeral message 702) to a receiving user.

The ephemeral message 702 is shown in FIG. 7 to be included within an ephemeral message group 704 (e.g., a collection of messages in a personal story, or an event story). The ephemeral message group 704 has an associated group duration parameter 708, a value of which determines a time duration for which the ephemeral message group 704 is presented and accessible to users of the messaging system 100. The group duration parameter 708, for example, may be the duration of a music concert, where the ephemeral message group 704 is a collection of content pertaining to that concert. Alternatively, a user (either the owning user or a curator user) may specify the value for the group duration parameter 708 when performing the setup and creation of the ephemeral message group 704.

Additionally, each ephemeral message 702 within the ephemeral message group 704 has an associated group participation parameter 710, a value of which determines the duration of time for which the ephemeral message 702 will be accessible within the context of the ephemeral message group 704. Accordingly, a particular ephemeral message group 704 may "expire" and become inaccessible within the context of the ephemeral message group 704, prior to the ephemeral message group 704 itself expiring in terms of the group duration parameter 708. The group duration parameter 708, group participation parameter 710, and message receiver identifier 624 each provide input to a group timer 714, which operationally determines, firstly, whether a particular ephemeral message 702 of the ephemeral message group 704 will be displayed to a particular receiving user and, if so, for how long. Note that the ephemeral message group 704 is also aware of the identity of the particular receiving user as a result of the message receiver identifier 624.

Accordingly, the group timer 714 operationally controls the overall lifespan of an associated ephemeral message group 704, as well as an individual ephemeral message 702 included in the ephemeral message group 704. In some examples, each and every ephemeral message 702 within the ephemeral message group 704 remains viewable and accessible for a time-period specified by the group duration parameter 708. In a further embodiment, a certain ephemeral message 702 may expire, within the context of ephemeral message group 704, based on a group participation parameter 710. Note that a message duration parameter 706 may still determine the duration of time for which a particular ephemeral message 702 is displayed to a receiving user, even within the context of the ephemeral message group 704. Accordingly, the message duration parameter 706 determines the duration of time that a particular ephemeral message 702 is displayed to a receiving user, regardless of whether the receiving user is viewing that ephemeral message 702 inside or outside the context of an ephemeral message group 704.

The ephemeral timer system 302 may furthermore operationally remove a particular ephemeral message 702 from the ephemeral message group 704 based on a determination that it has exceeded an associated group participation parameter 710. For example, when a sending user has established a group participation parameter 710 of 24 hours from posting, the ephemeral timer system 302 will remove the relevant ephemeral message 702 from the ephemeral message group 704 after the specified 24 hours. The ephemeral timer system 302 also operates to remove an ephemeral message group 704 either when the group participation parameter 710 for each and every ephemeral message 702 within the ephemeral message group 704 has expired, or when the ephemeral message group 704 itself has expired in terms of the group duration parameter 708.

In certain use cases, a creator of a particular ephemeral message group 704 may specify an indefinite group duration parameter 708. In this case, the expiration of the group participation parameter 710 for the last remaining ephemeral message 702 within the ephemeral message group 704 will determine when the ephemeral message group 704 itself expires. In this case, a new ephemeral message 702, added to the ephemeral message group 704, with a new group participation parameter 710, effectively extends the life of an ephemeral message group 704 to equal the value of the group participation parameter 710.

Responsive to the ephemeral timer system 302 determining that an ephemeral message group 704 has expired (e.g., is no longer accessible), the ephemeral timer system 302 communicates with the messaging system 100 (and, for example, specifically the messaging client application 104) to cause an indicium (e.g., an icon) associated with the relevant ephemeral message group 704 to no longer be displayed within a user interface of the messaging client application 104. Similarly, when the ephemeral timer system 302 determines that the message duration parameter 706 for a particular ephemeral message 702 has expired, the ephemeral timer system 302 causes the messaging client application 104 to no longer display an indicium (e.g., an icon or textual identification) associated with the ephemeral message 702.

Figure 8:
FIG. 8 illustrates a screenshot 800 of a user interface 802 in accordance with some examples.

FIG. 8 is a user interface diagram illustrating a screenshot 800 of a user interface 802 presented by the messaging application, the user interface 802 including an event invitation creation indicium in the form of an event invitation icon 804 that is user selectable by a user to initiate an event invitation creation flow. Responsive to user selection of the event invitation icon 804, the user may be presented with an invitation creation user interface.

Figure 9:
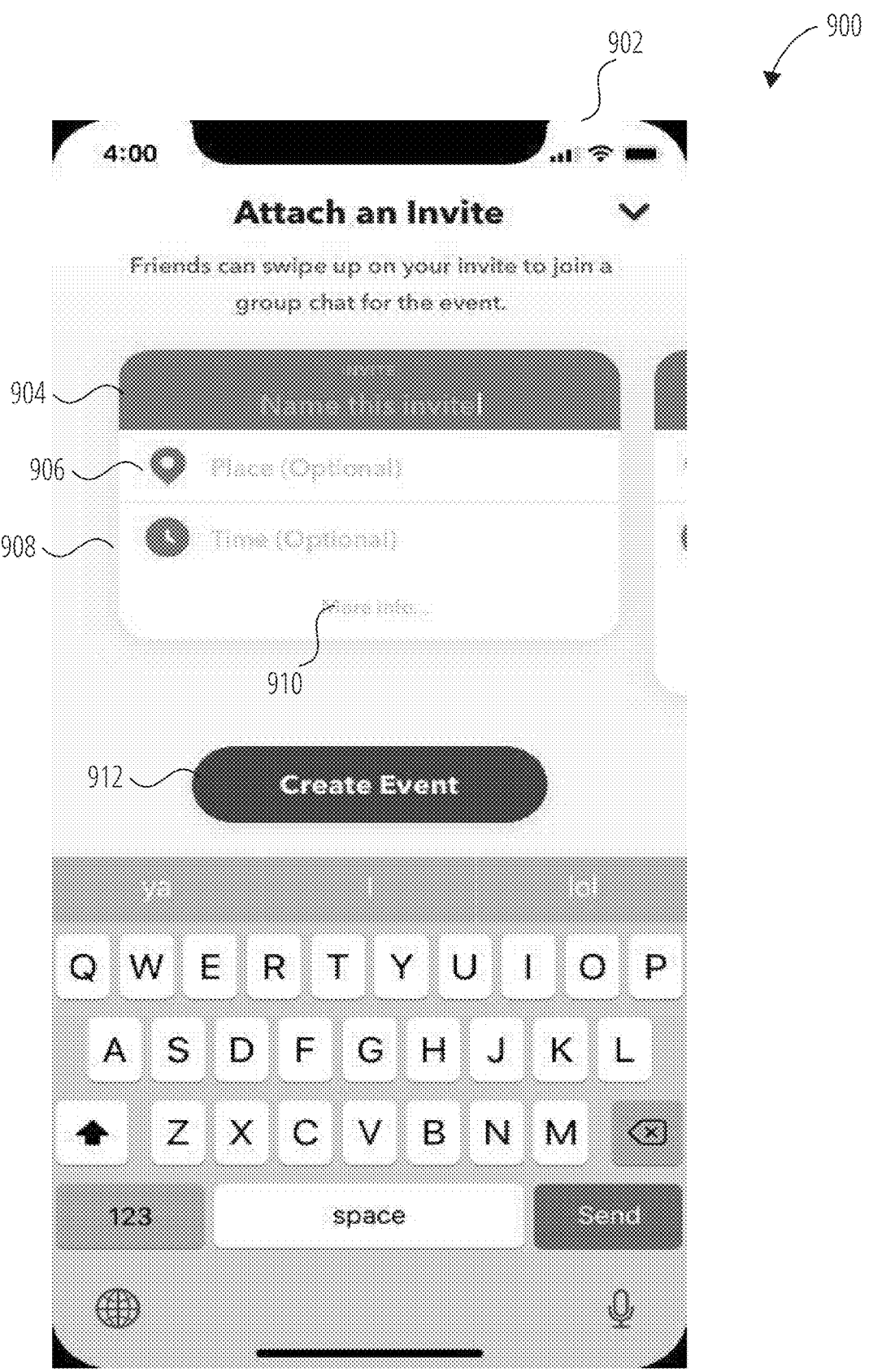
FIG. 9 illustrates a screenshot 900 of a user interface 902 in accordance with some examples.

FIG. 9 is a user interface diagram illustrating a screenshot 900 of an example invitation creation user interface 902, according to some examples, an event name field 904 to receive a name for the event invitation, and event location field 906 to receive a location or place for the event, and an event time field 908 to receive time and date information for the planned event. A further information selection 910 is user selectable to input further information pertaining to the event, while a create event button 912 is user selectable to create an event. It will be appreciated that the information inputted by the user interface 902 will be communicated from the messaging client application 104 to the application server 112, and stored in the data structure 500, described above with reference to FIG. 5, by the group invitation system 120. Further, user selection of the create event button 912 initiates the creation of a respective instance of event data 502 for the relevant event.

Figure 10:
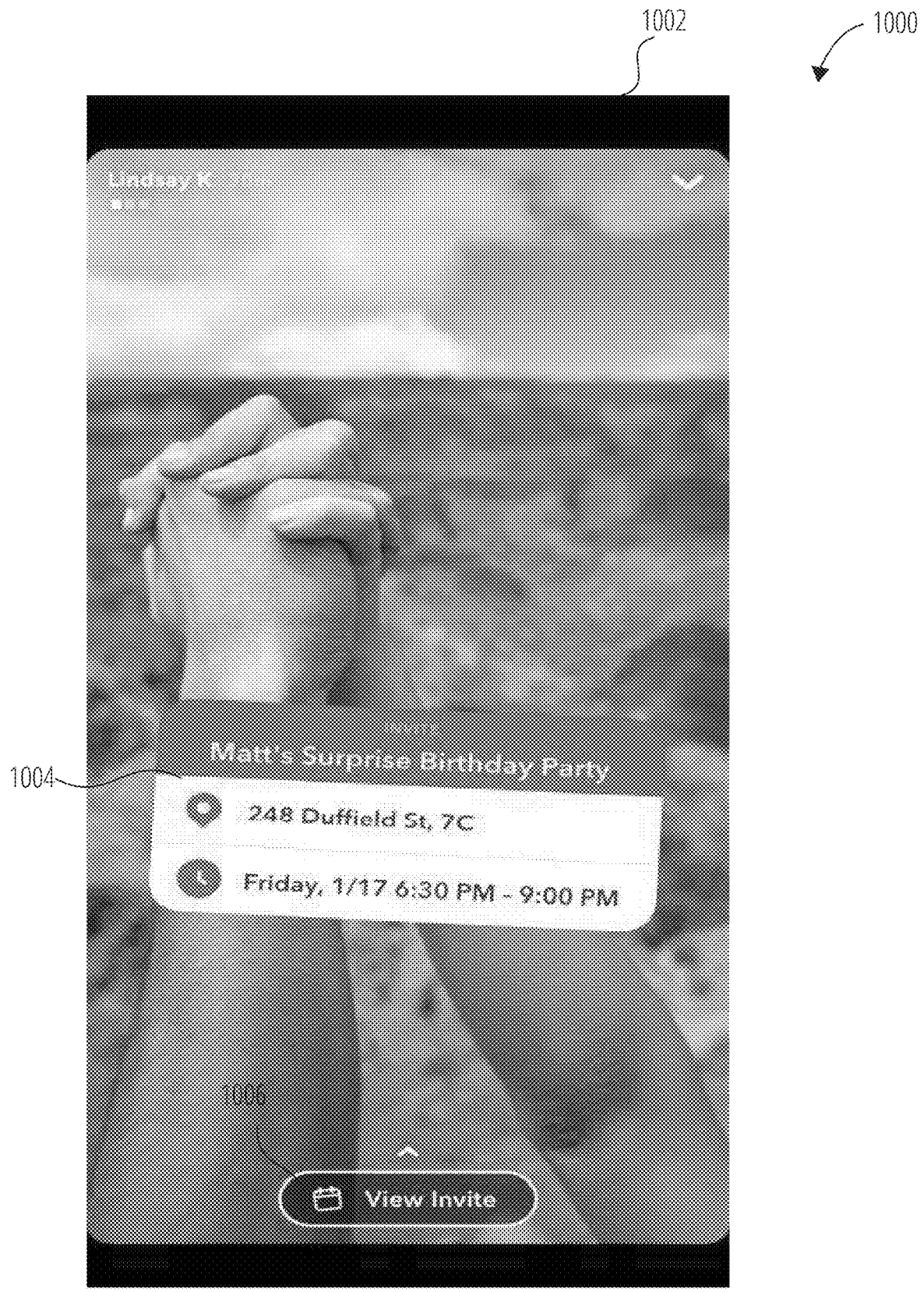
FIG. 10 illustrates a screenshot 1000 of a user interface 1002 in accordance with some examples.

FIG. 10 is a user interface diagram illustrating a screenshot 1000 of an example invitation user interface 1002, within which is displayed a compact event invitation 1004 as may be displayed to an invited user by way of a message communicated using the messaging system 100. The user interface 1002 also includes a view invite selector 1006, which is user-selectable by the invited user in order to view a full version of the event invitation that includes additional details and provides response options. Specifically, responsive to a user selection of the view invite selector 1006, the invited user is presented with an extended event invitation, an example of which is shown in FIG. 11

Figure 11:
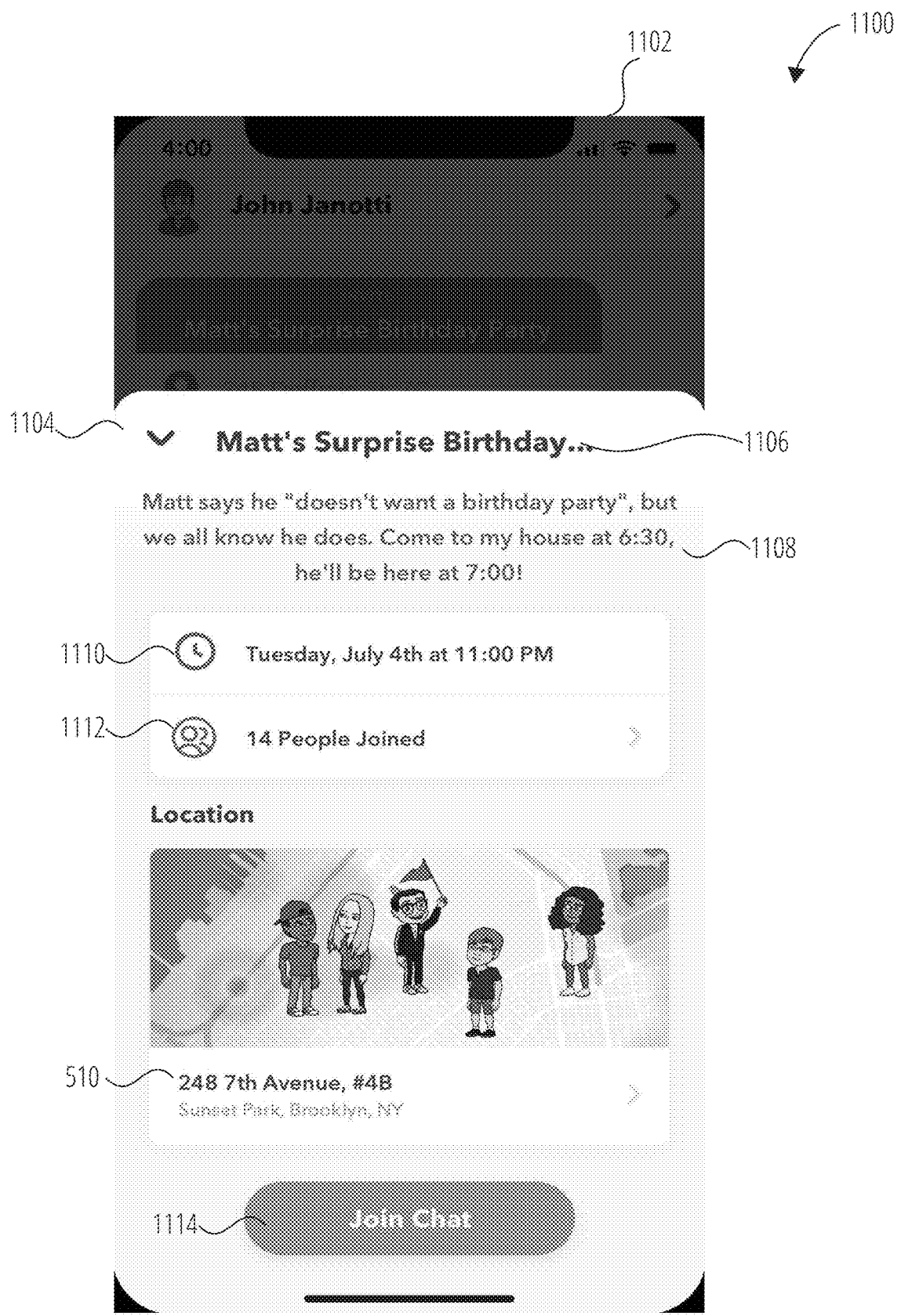
FIG. 11 illustrates a screenshot 1100 of a user interface 1102 in accordance with some examples.

FIG. 11 is a user interface diagram illustrating a screenshot 1100 of an example expanded invitation user interface 1102, on which is displayed and expanded event invitation 1104 which includes event name data 1106, invitation detail data 1108, event date data 1110, event join data 1112 (indicating a number of people that have joined a group chat pertaining to the event), location data 510, and a join chat icon 1114 that is user selectable to join a group chat pertaining to the event. By selectively displaying or emphasizing positive signals (e.g., the number of people that have joined a group chat pertaining to the event), but not displaying (or deemphasizing) negative signals (e.g., showing that a certain number of people have been invited, but only a certain number of people responded), the example group event invitation system seeks to hide negative signals (e.g., inaction) that leads to negative group behavior.

Similarly, it would be appreciated that during a conversation (e.g., a group chat) that any turn event is much easier and less of a commitment than RSVPing to an event per se. Accordingly, the example group invitation system enables a user to conveniently join a conversation and accordingly express interest in a group event, without an upfront commitment to attend or not attend the event. This may, in turn, build positive momentum with respect to the event, and encourage a greater degree of actual downstream attendance of the event.

Figure 12:
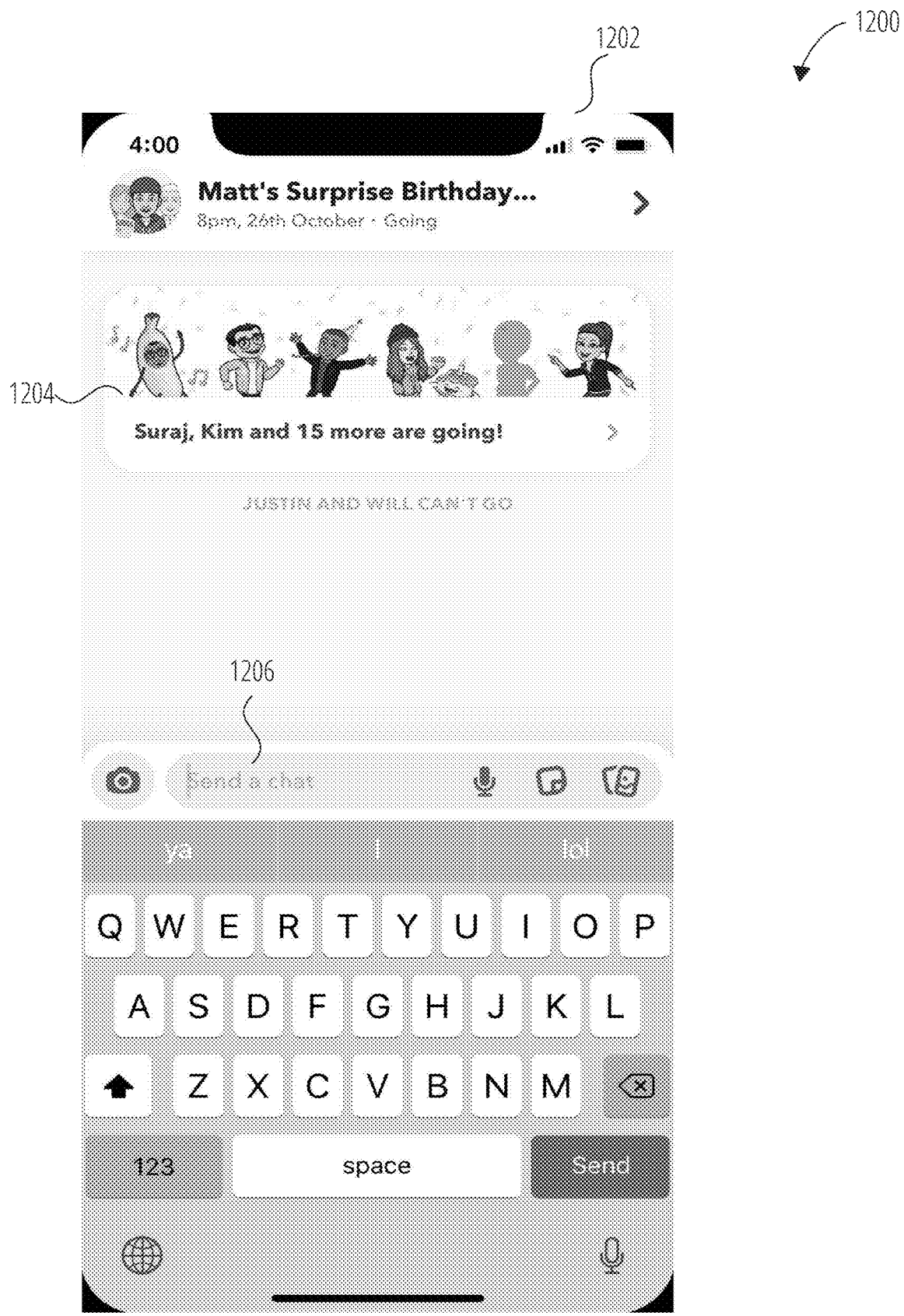
FIG. 12 illustrates a screenshot 1200 of a user interface 1202 in accordance with some examples.

FIG. 12 is a user interface diagram illustrating a screenshot 1200 of an example group chat user interface 1202, which shows messages in a group chat pertaining to a particular event and which is displayed responsive to user selection of the join chat icon 1114. As shown, based on joining an event-related group chat, attendance data 1204 is shown as an initial message, the attendance data 1204 being user-selectable to display further details regarding the event. The interface also includes a message input field 1206, using which a user can contribute to the group chat.

Figure 13:
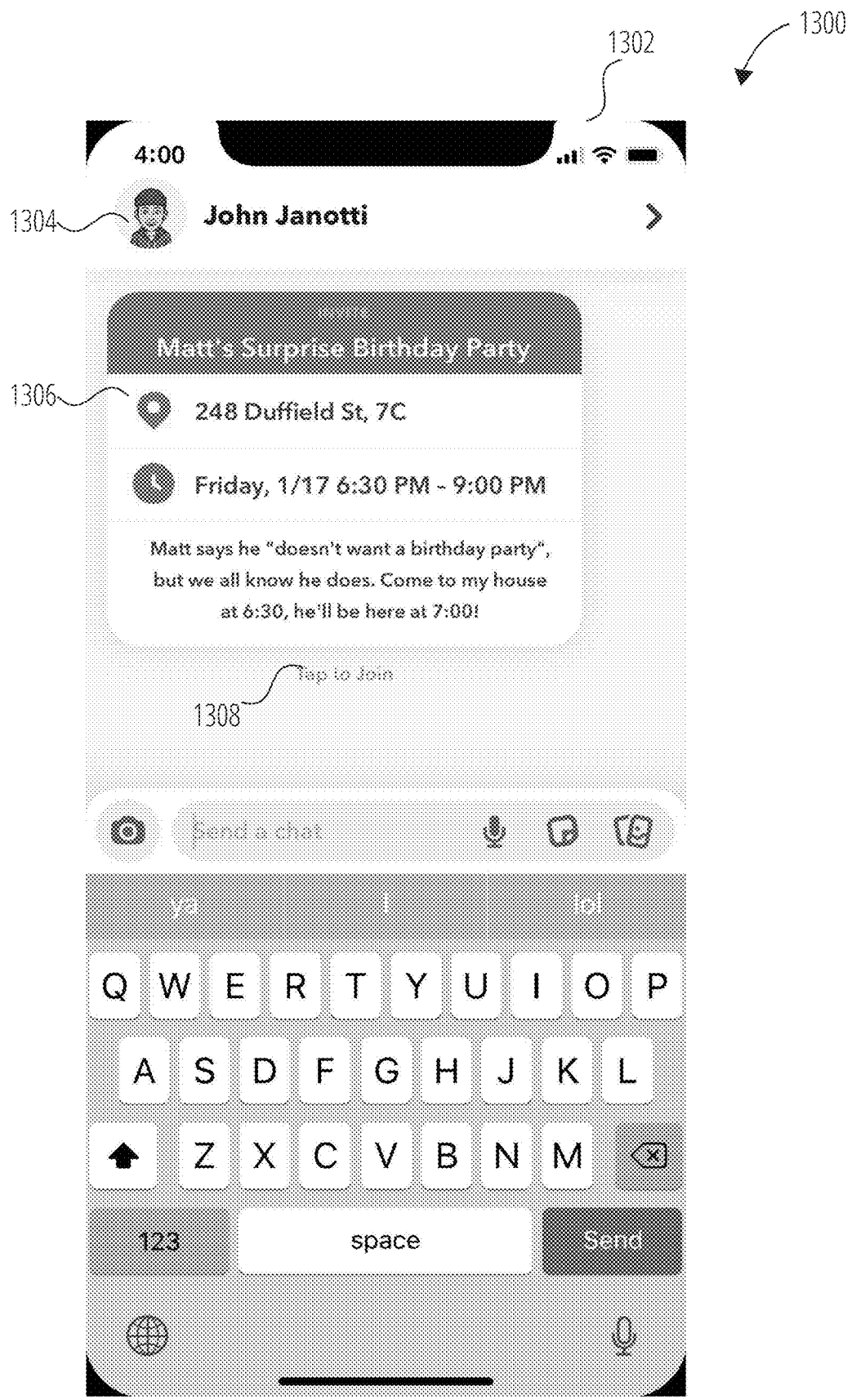
FIG. 13 illustrates a screenshot 1300 of a user interface 1302 in accordance with some examples.

FIG. 13 is a user interface diagram illustrating a screenshot 1300 of an example messaging user interface 1302, as may be presented by the messaging client application, showing the communication of an event invitation message from an inviting user (e.g., message sender), identified by an inviter user identifier 1304. The invitation message comprises event invitation data 1306, as well as a "tap to join" join selector 1308, which is user-selectable by a receiving user in order to join the group chat pertaining to the relevant event. By enabling and inviting user conveniently to send a one-to-one invitation (which includes certain minimum information regarding the event) to an invited user to join a group chat pertaining to an event, the example group invitation system facilitates communication whereby an invited user may feel accountable to respond to the one-to-one direct invitation message from another user.

Figure 14:
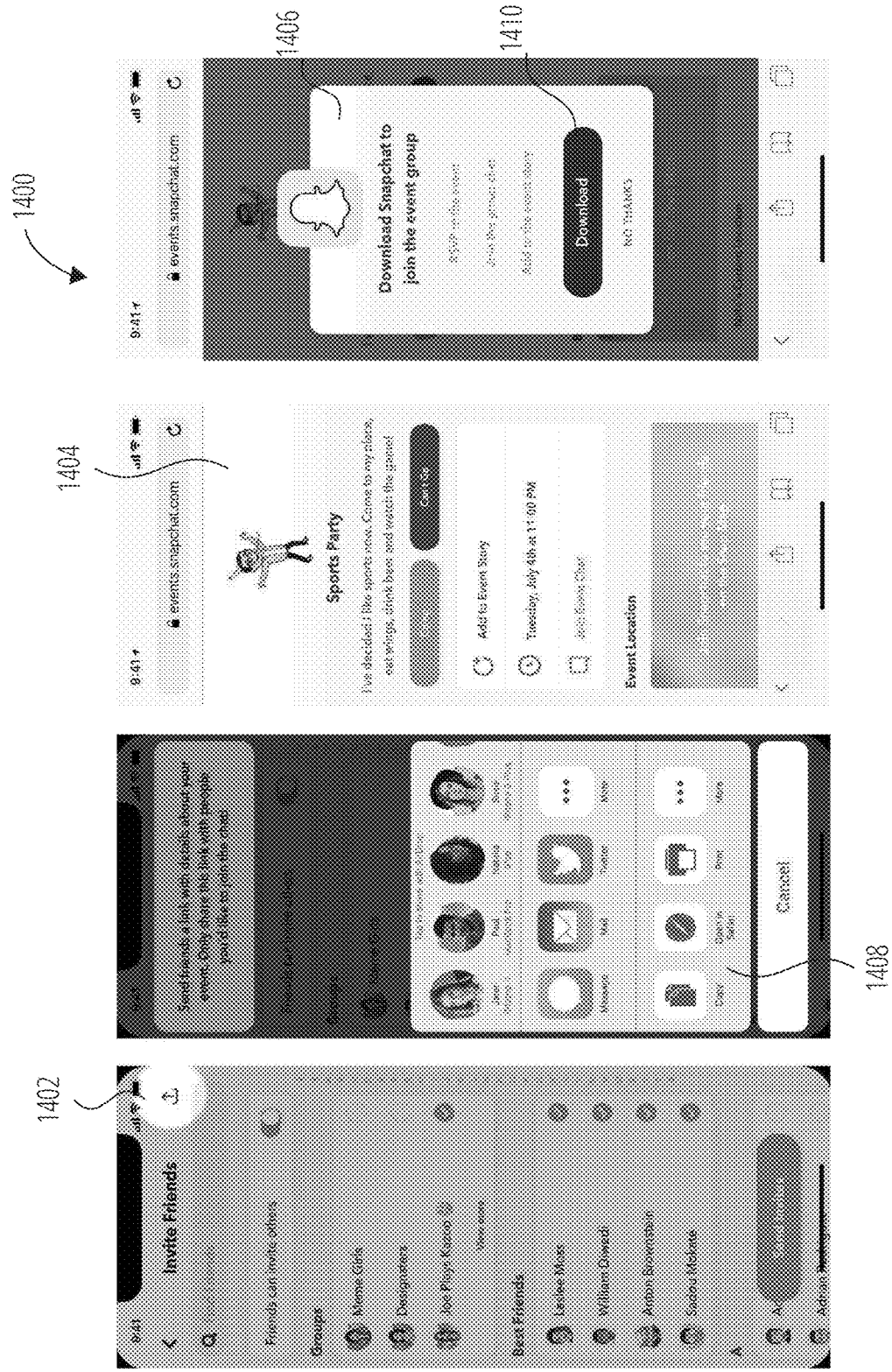
FIG. 14 illustrates a user interface flow 1400 in accordance with some examples.

The example group invitation system 120 also seeks to facilitate the convenient sending of invitations to people that are not users (e.g., registered users or users of the messaging client application 104) of the messaging system 100. FIG. 14 is a user interface diagram illustrating a user interface flow 1400, according to some examples, whereby a network location identifiers in the form of a Uniform Resource Locator (URL) or link to a web-based invitation can be communicated via other communication platforms or mechanisms (e.g., text (e.g., Short Message Service (SMS), email, Twitter, iMessage, etc.), or directly from another application executing on a client device 102 to a person that is not a user of the messaging system 100.

A user selection of a message creation indicium in the form of a share icon 1402 by a user invokes a communication mechanism selection interface 1408, within which a user can select a particular communication mechanism for communicating a network location identifier in the example form of an invitation URL to the recipient via the relevant communication mechanism. The communication mechanism selection interface 1408 may be provided by an operating system of the client device 102, such as the iPhone or Android operating system. The selection interface 1408 may present any number of communication mechanisms or systems available to a user of the client device 102, based on such mechanism supported by the operating system of the client device 102 or third-party applications installed on the client device 102.

Responsive to a user selection of a particular communication mechanism (e.g., text message or email) from within the communication mechanism selection interface 1408, the corresponding communication application (e.g., a text message application or email application) is invoked, and a message created that includes the invitation URL. The invitation URL, in one example, identifies a network resource in the form of an invitation webpage 1404 specific to a particular event. The invitation URL further includes identification information identifying an inviting user (or sending user) of the invitation, as well as one or more invited users (or receiving users). This identification information may be used to customize the presentation of information within the invitation webpage 1404, and also to gather statistics regarding inviting and invited users.

User selection of the invitation URL results in the display of an event invitation interface in the example form of an invitation webpage 1404, using which an invited user can respond to the invitation (e.g., by user selection of the "going", or "can't go" buttons). Additionally, the webpage 1404 includes various event details and a user-selectable indicium in the form of a "join event chat" URL, which is user-selectable to invoke a messaging client application download page 1406. The messaging client application download page 1406, in turn, includes a download URL associated with a download button 1410 that is user-selectable to invoke download of a platform-based messaging client application (e.g., the messaging client application 104). It also is noted that the messaging client application download page 1406 communicates to the invited user the ability to RSVP to the event, join a group chat, and also add to the event media collection using the messaging client application 104.

The download URL, in addition to invoking a download process for the messaging client application 104, also embeds information to automatically join the invited user to the event-centric group chat following a download and installation of the messaging client application 104 on a client device 102 of the invited user. This embedded information may include a unique identifier for the event (e.g., as stored within the event data 502), as well as identifies for both the inviting user and the invited user (e.g., as stored within the user data 506). To this end, a web server 126 forming part of the messaging server system 108 (e.g., running parallel to the Application Program Interface (API) server 110), may create the download URL to include this embedded information, user selection of the download URL serving to pass this information to the downloaded messaging client application 104 either on the server-side (e.g., prior to download), or on the client-side (e.g., on the client device 102 after a download and installation). In this way, the invited user is conveniently joined to the group chat relating to the event, without requiring additional navigation steps of searching advocating the event and issuing a further request to join the group chat.

Figure 15:
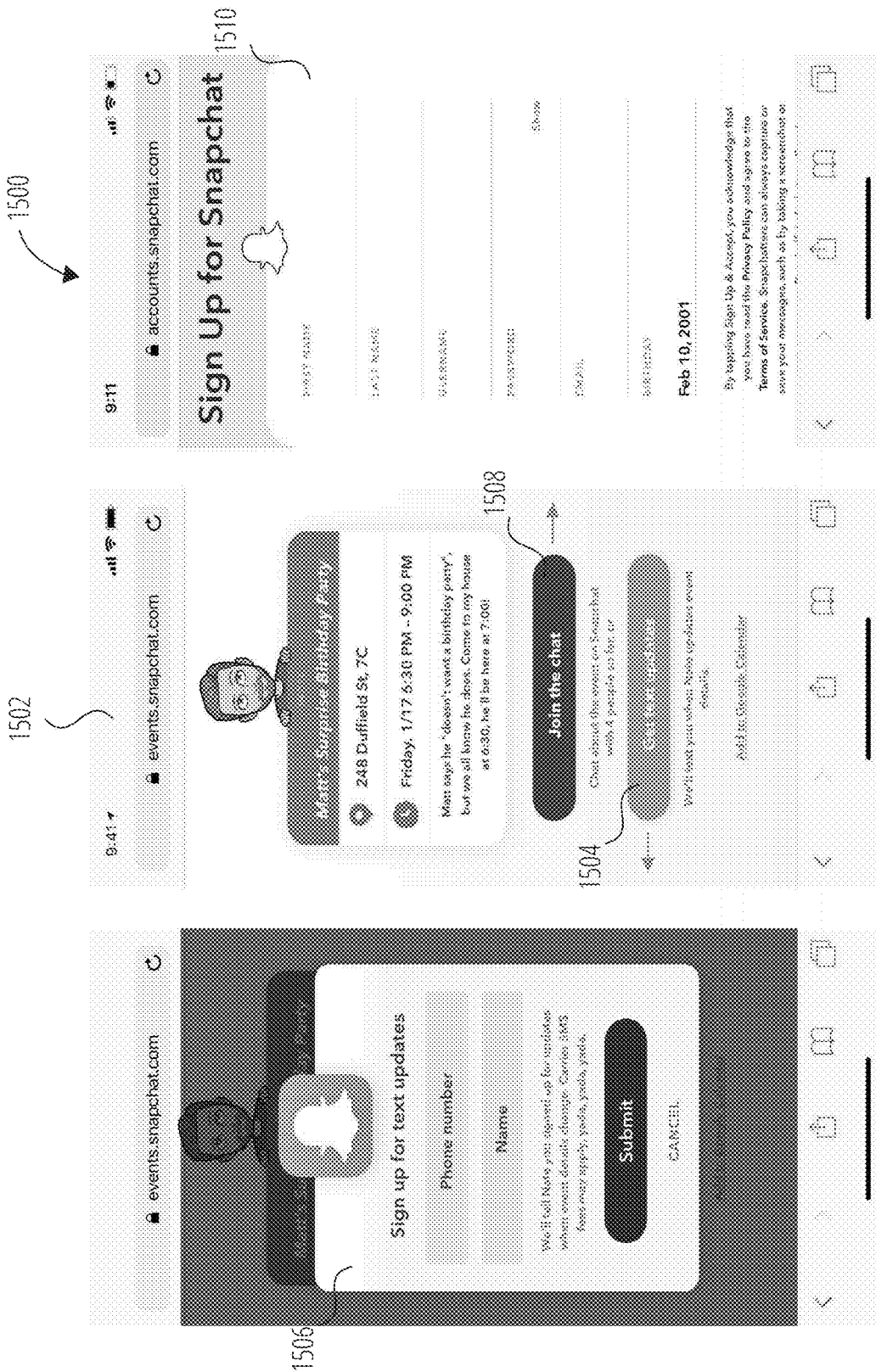
FIG. 15 illustrates a user interface sequence 1500 in accordance with some examples.

FIG. 15 is a user interface diagram illustrating a user interface sequence 1500, according to certain examples, that may be presented to a person who is again not a registered user of the messaging system 100, but may wish to receive updates regarding a particular event, while simultaneously presenting a compelling invitation to join the group chat by downloading the messaging client application 104.

Specifically, in this example, a user interface in the form of an invitation webpage 1502 may be presented to an off-platform (e.g., non-registered) user of the messaging system 100, responsive to selection of an invitation URL included within a message received via a third-party messaging system or application, such as that described above with reference to FIG. 14. The invitation webpage 1502, in addition to providing details regarding the relevant event, includes a user-selectable indicium in the form of a "get text updates" button 1504, which is associated with an update URL for a registration interface in the example form of a text (e.g., Short Message Service (SMS)) message sign-up webpage 1506. The webpage 1506, in turn, includes input fields for receiving a mobile telephone number and name from the invited user, which allows the invited user to register (e.g., "sign up") for text message updates regarding the particular event (e.g., regarding changes to event details). Using the webpage 1506, and by inputting the requested information into the input fields, a non-registered user can conveniently be recorded within the messaging system 100 as an update recipient, without requiring that the nonregistered user register with the messaging system 100, or download and install the messaging client application 104. This, in turn, facilitates a degree of engagement by the nonregistered user that may be non-threatening and very easy to perform, with a minimum commitment to attend the event or participate in any communications pertaining thereto.

The invitation webpage 1502 also includes a further user-selectable indicium in the form of a "join the chat" button 1508, which is distinct from the button 1504 and is associated with a join URL for a further registration interface in the example form of a messaging client application sign up webpage 1510. The webpage 1510 includes a number of input fields using which an invited user can register with the messaging system 100, and also be automatically added to a group chat pertaining to the event and download of the messaging client application 104, as described above with reference to FIG. 14. In this example, the webpage 1510 may include a register button, that is user-selectable to invoke download of the messaging client application 104, and registration of the user both within the messaging system 100, and also specifically as a participant within the group chat.

Figure 16:
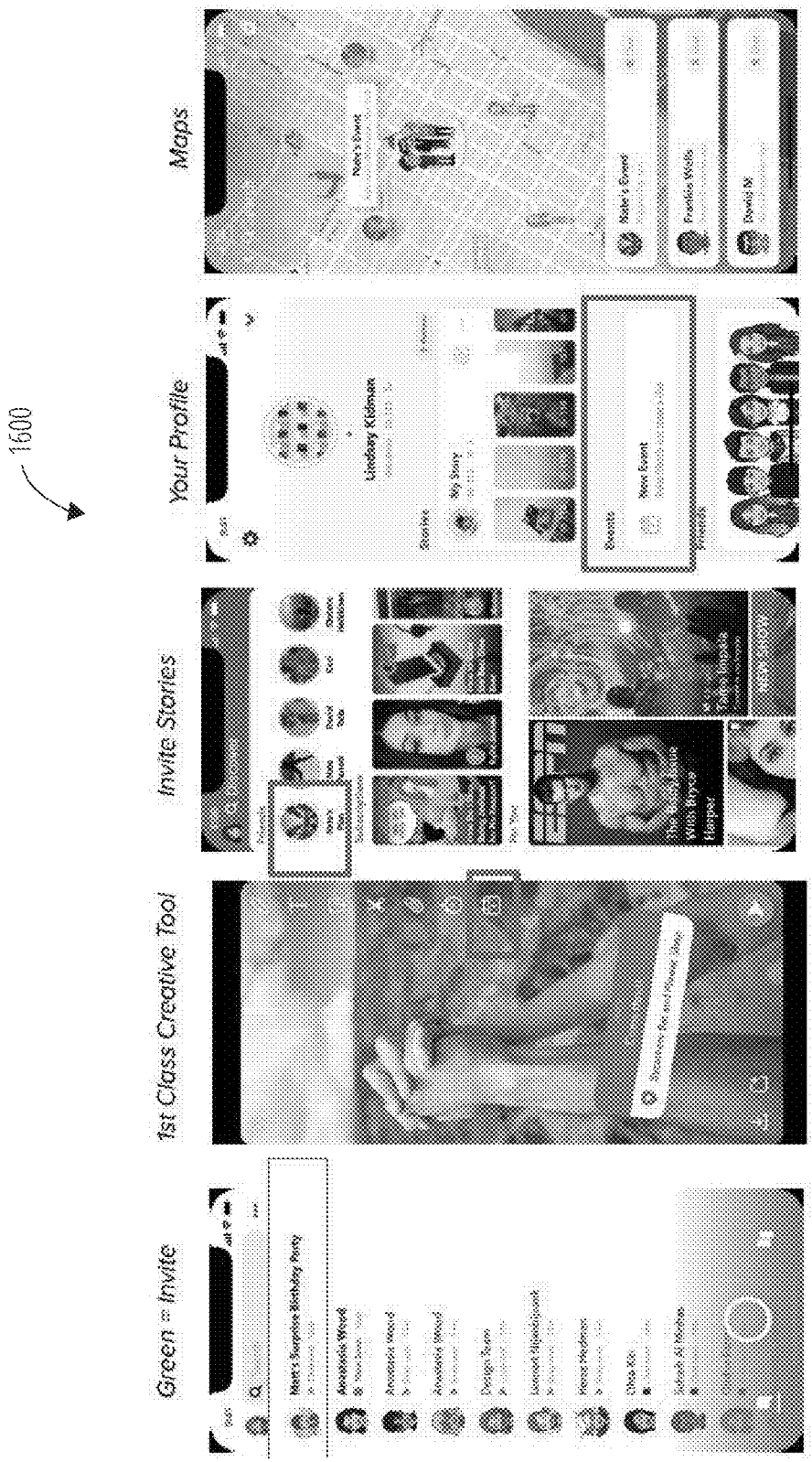
FIG. 16 illustrates screenshots 1600 in accordance with some examples.

FIG. 16 is a user interface diagram illustrating screenshots 1600 of various user interfaces that may be presented by the messaging client application 104 and in which event information is surfaced in order to make this information readily discoverable by users of the messaging client application 104

Figure 17:
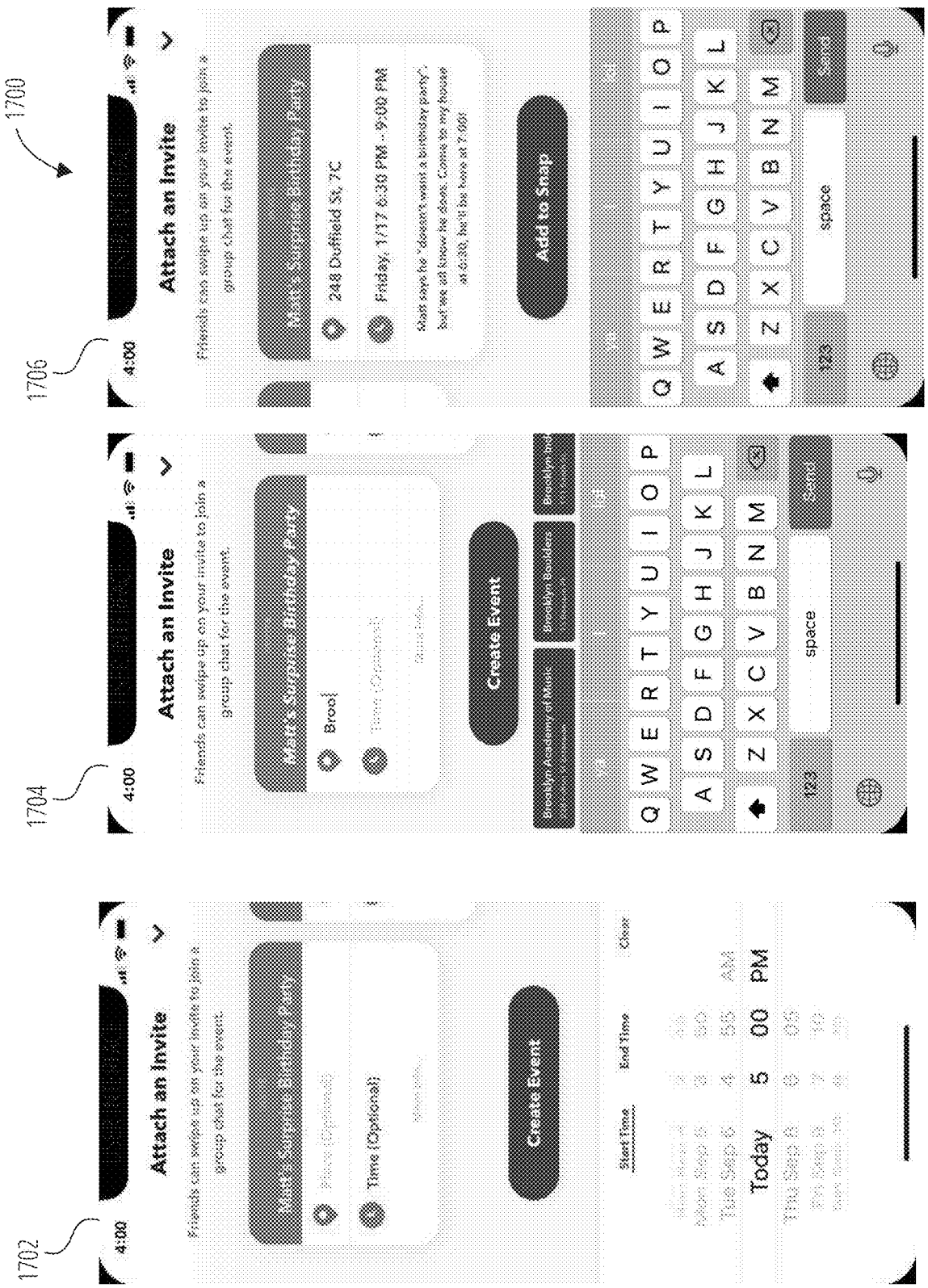
FIG. 17 illustrates screenshots 1700 of a user interface 1702 and user interface 1704 in accordance with some examples.

FIG. 17 is a user interface diagram illustrating screenshots 1700 of a sequence of interfaces that may be presented to assist the user in composing and creating an invitation to an event, which can be communicated to other users of the messaging system 100 via a chat message, or to off-platform people who are not users of the messaging system 100 by means of a URL (or other link) to a network resource that will cause the display of invitation information to the off-platform person.

A first user interface 1702 shows a time entry scroll mechanism that a user can conveniently manipulate to specify a time for an event.

A second user interface 1704 illustrates a predictive event location name mechanism, whereby a predictive spelling function services the names of potential event locations based on letters entered into the event location field of event creation interface.

A third user interface 1706 includes an "add to snap" button, which is user-selectable to add the event invitation to an image-based message as an image overlay or modification. Specifically, a graphic depicting details of the event the image processing system 116, and overlaid on an image (e.g., a photograph) that is included in the message communicated by the user. In this case, the graphic may be user-selectable by a recipient of the image-based message in order to join a group chat pertaining to the event, or even to respond (e.g., RSVP) to the invitation.

Figure 18:
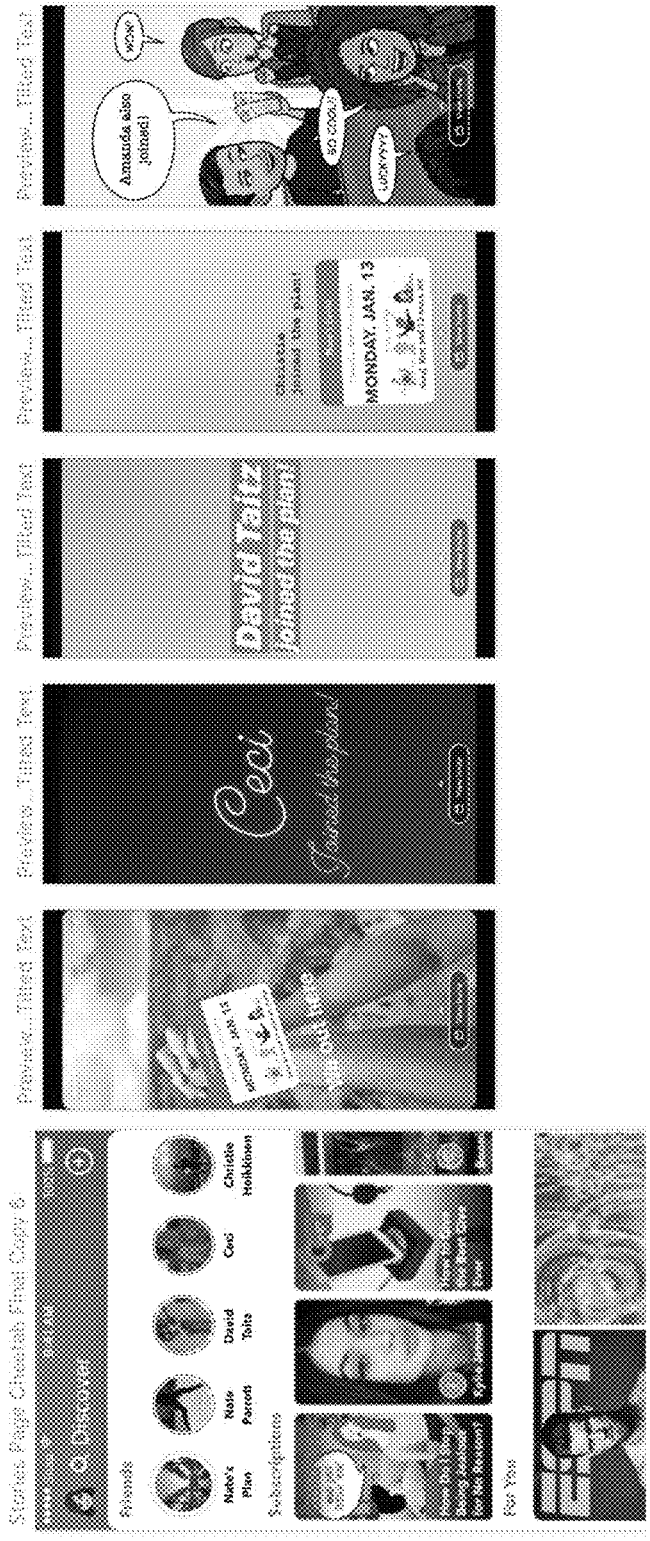
FIG. 18 illustrates screenshots 1800 in accordance with some examples.

FIG. 18 is a user interface diagram illustrating screenshots 1800 of a number of example user interfaces showing the integration of event information within collections of media content (e.g., stories), by the collection management system 304. Specifically, an event invitation image, together with updated information pertaining to the event (e.g., announcing that a specific user as it joined the group chat or is planning to attend the event) may be displayed within an automatically created event story around a particular event. To this end, the collection management system 304 may interface with the group invitation system 120 in order to automatically create a media collection (e.g., created by the collection management system 304) that is presented to members of a group chat, as reflected in the group chat data 504.

Figure 19:
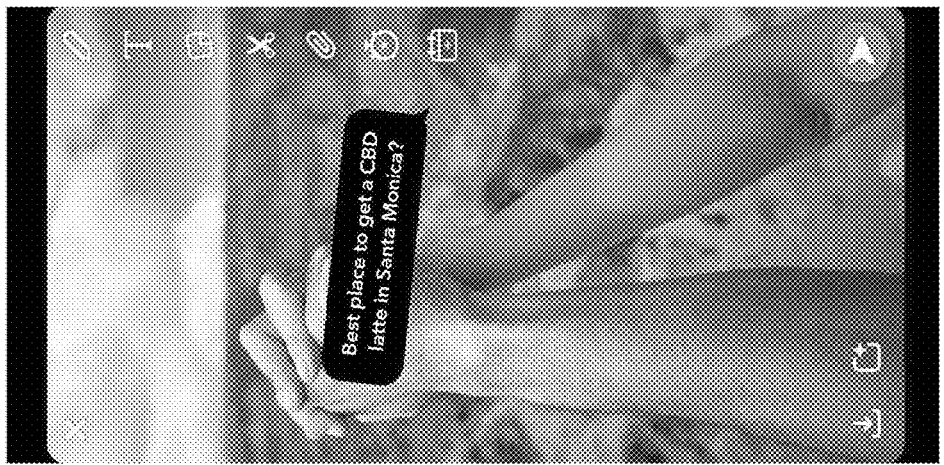
FIG. 19 illustrates screenshots 1900 in accordance with some examples.
Figure 19:
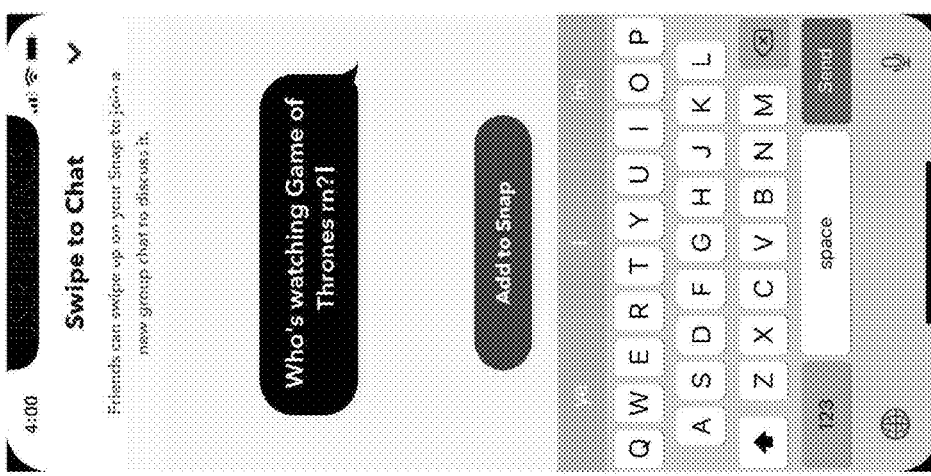
Figure 19:
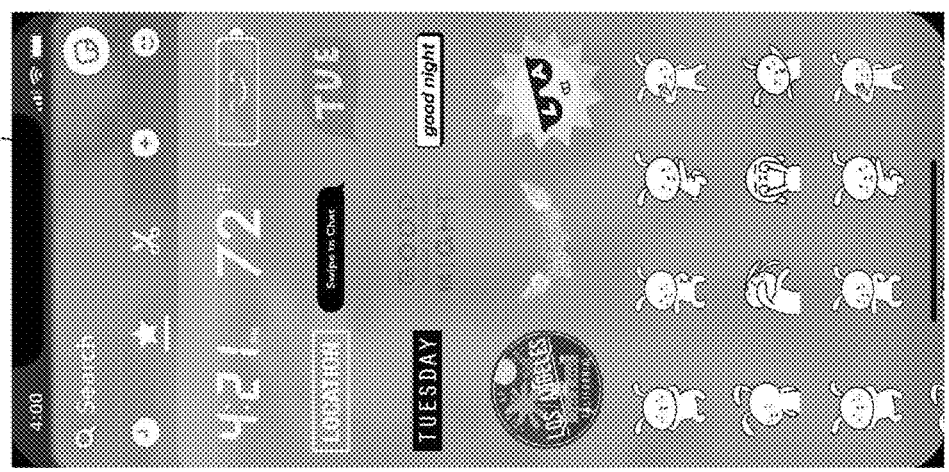

FIG. 19 is a user interface diagram illustrating screenshots 1900 of a number of example user interfaces 1902 including "join a group" icons (or stickers) that invite a user to join a group chat, without providing event-specific details.

Figure 20:
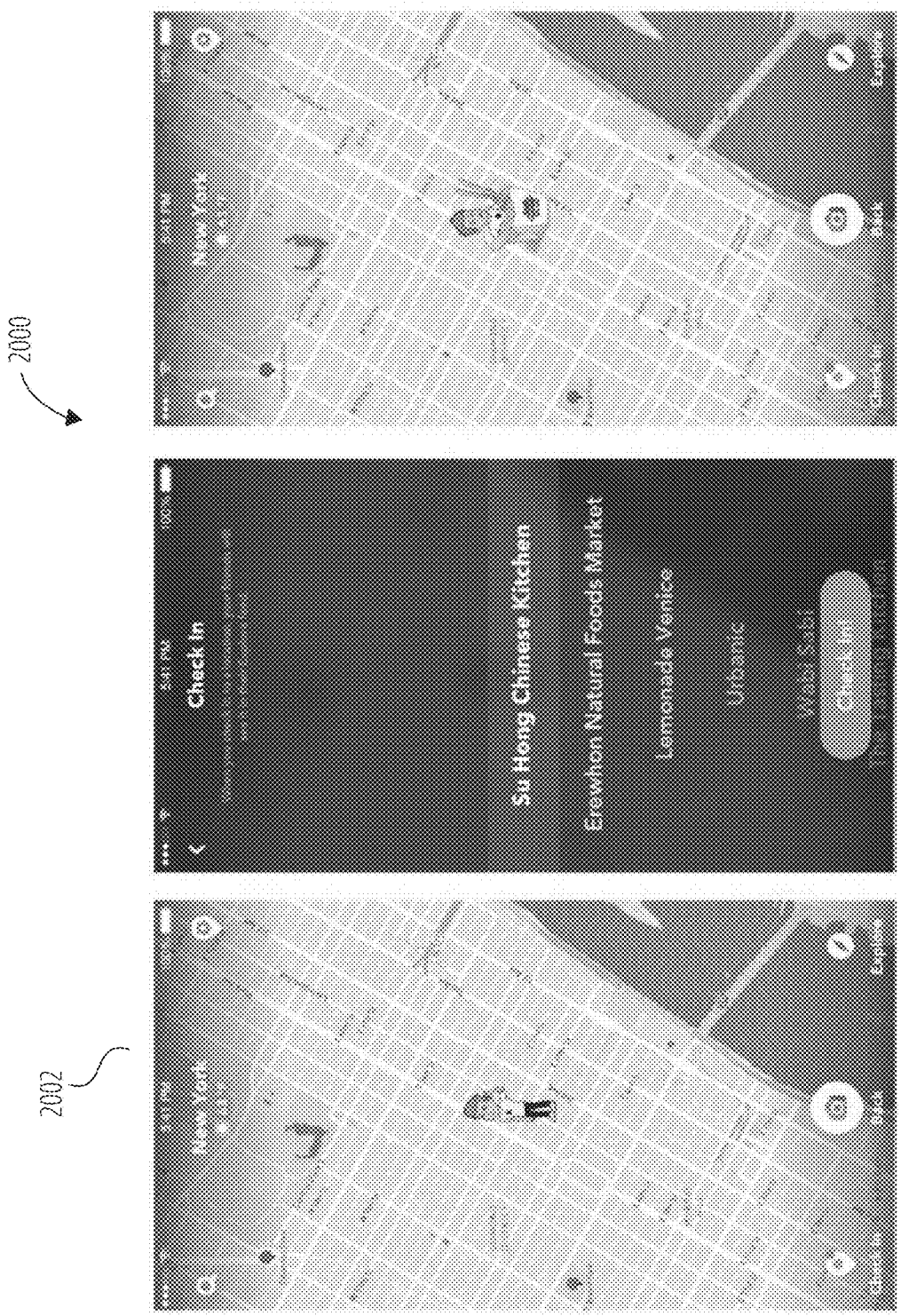
FIG. 20 illustrates screenshots 2000 in accordance with some examples.

FIG. 20 is a user interface diagram illustrating screenshots 2000 of a number of user interfaces user interfaces 2002 that illustrate a map check-in feature of the messaging client application 104 as providing an entry point into an invitation to an event. Specifically, responsive to performing a checking operation at a location via the messaging client application 104, an invitation to an event (or to join a chat pertaining to an event) at or within a predetermined proximity of the checking location may be presented to the user performing the map check-in.

Figure 21:
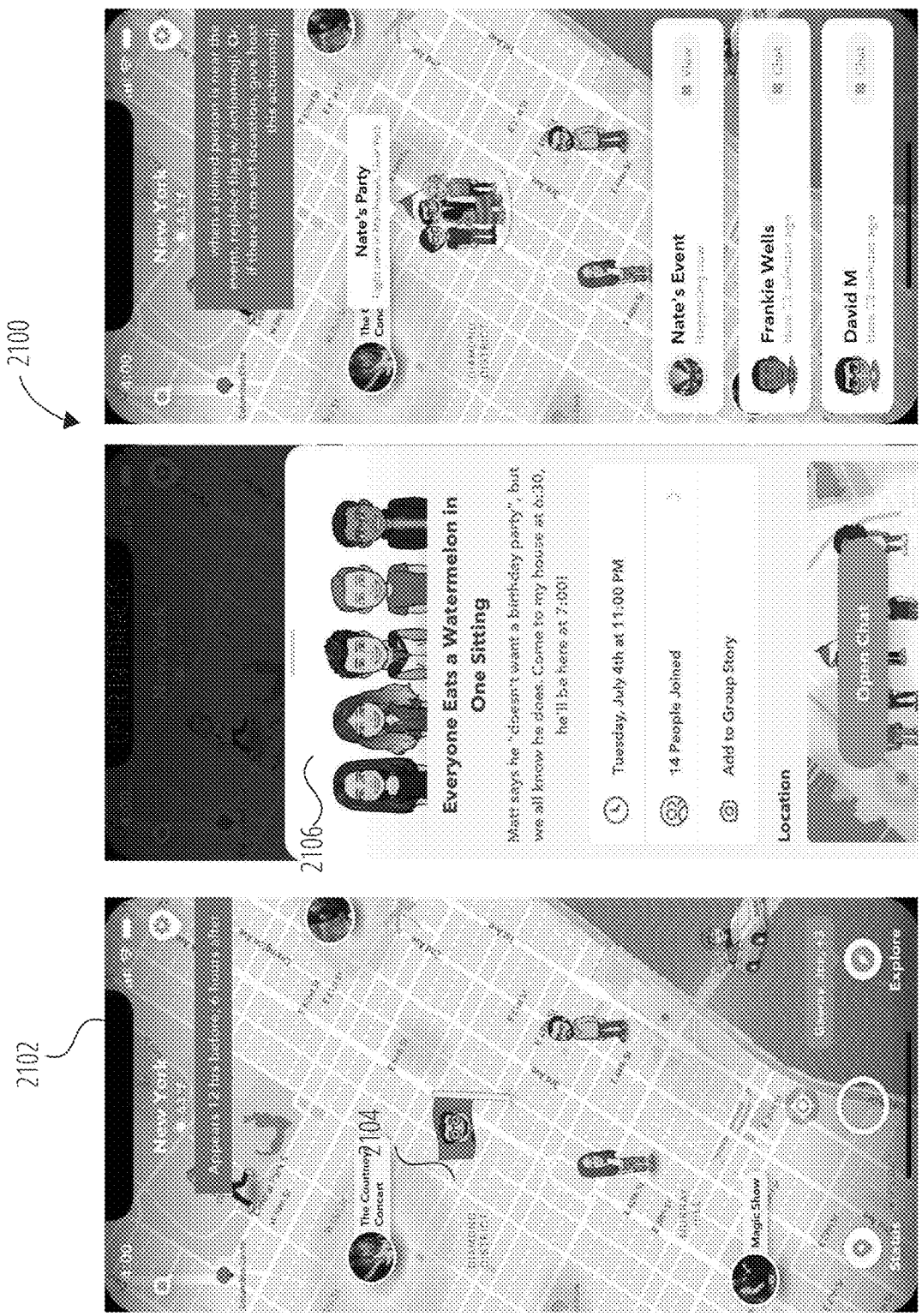
FIG. 21 illustrates screenshots 2100 in accordance with some examples.

FIG. 21 is a user interface diagram illustrating screenshots 2100 of a number of user interfaces 2102 that show further integration between a map (or geolocation) function of the messaging client application 104 and the group invitation system 120. Specifically, an event icon 2104 (e.g., a flag) may be displayed within a map interface of the messaging client application 104 within a predetermined number of hours before the start of an event, and a predetermined number of hours after the start of the event). The event icon 2104 is user selectable to invoke display of an event invitation 2106 using which a user can request to be added to a group chat pertaining to the event, and also added to a group story related to the relevant event. When a "joined" user is determined by the messaging client application 104 to be within a predetermined proximity of the actual event, the event icon 2104 may be updated to indicate an action (e.g., invite the user to participate within a discussion on the group chat regarding the event). In this way, a user that has joined the group chat may be prompted to provide updates regarding his or her location, and other information pertinent to the event, as the event is approached. Further, additional information regarding the event, as gleaned from the group chat, may also be displayed more prominently within the user interface to a user once within a predetermined geographic proximity within predetermined time parameters surrounding the start and/or end of the event.

Figure 22:
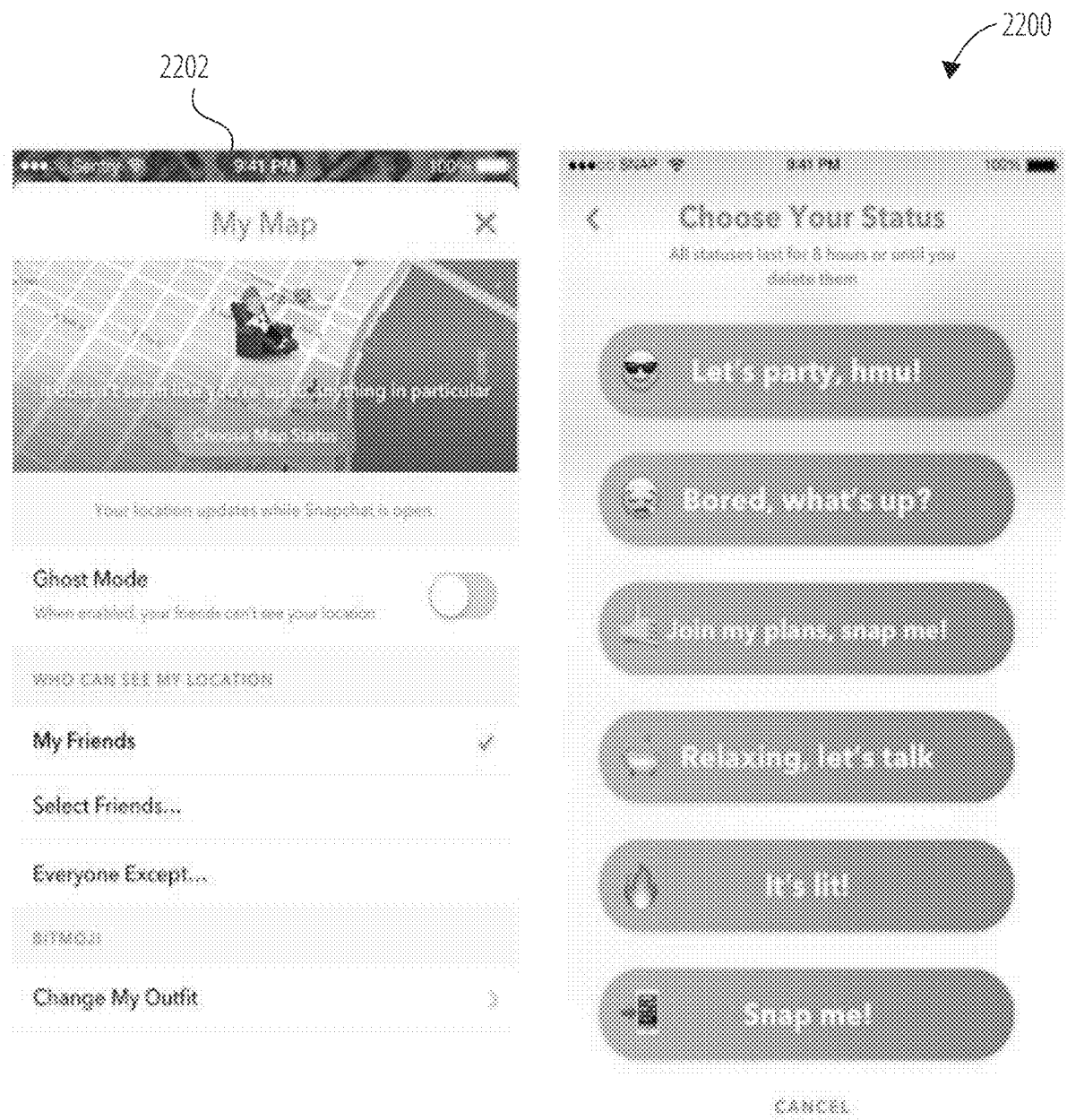
FIG. 22 illustrates screenshots 2200 in accordance with some examples.

FIG. 22 is a user interface diagram illustrating screenshots 2200 of further user interfaces 2202 that show even further integration between the maps (or geolocation) function of the messaging client application 104 and the group invitation system 120. The user interfaces 2202 illustrate a number of status updates that a user may select to be presented to friends or other groups of users of the messaging system 100. The status information may be presented in association or conjunction with and event icon 2104 related to the event on a maps interface.

Figure 23:
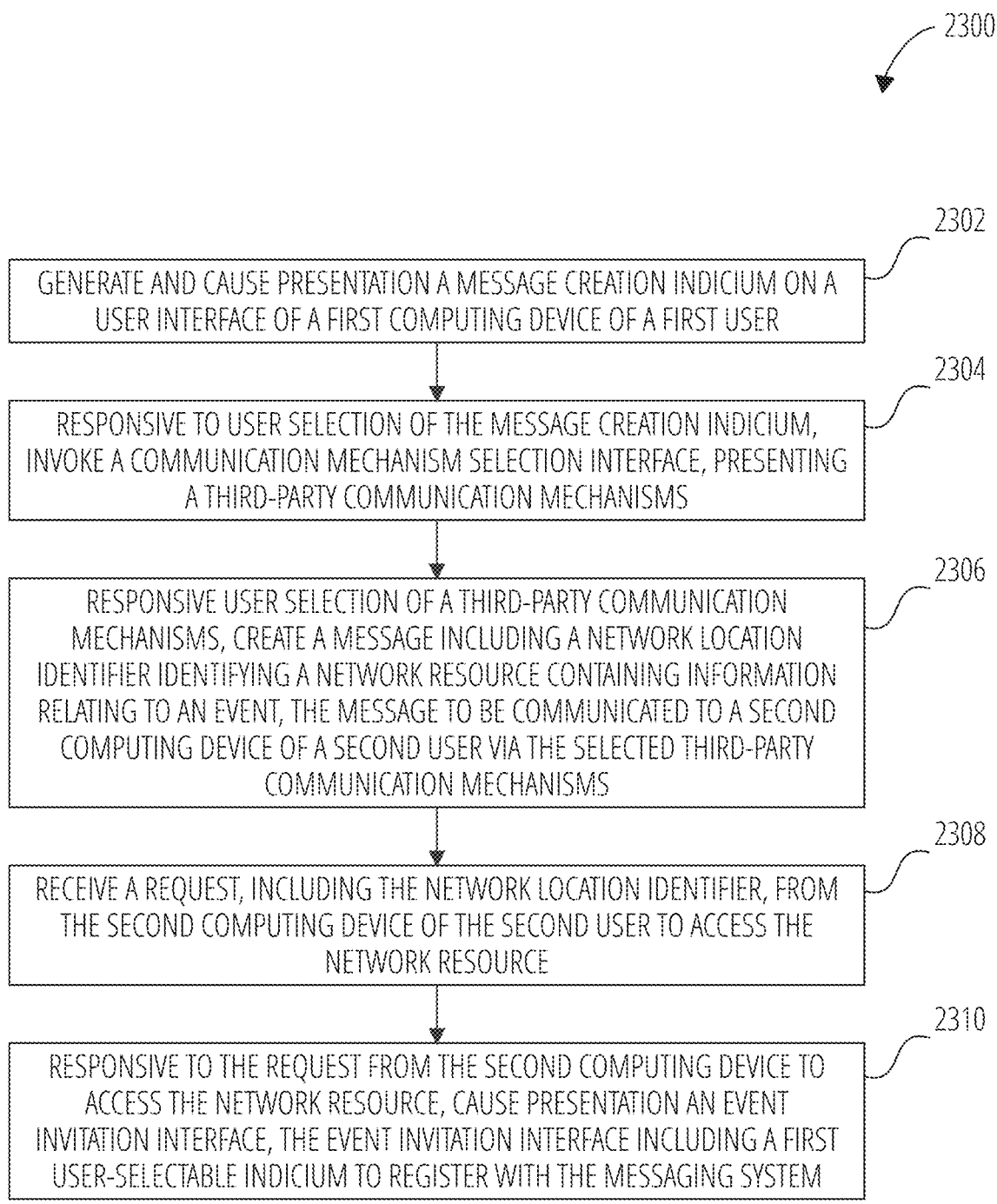
FIG. 23 illustrates a method 2300 in accordance with some examples.

FIG. 23 is a flowchart illustrating a method 2300, according to some examples, to facilitate messaging by a messaging system (e.g., messaging system 100) with off-platform entities (e.g., people).

The method 2300 commences at block 2302, with the generation, using one or more processors of the client device 102 and the messaging server system 108, of message creation indicium on a user interface of a first computing device of a first user. For example, the messaging client application 104, executing on the client device 102, may generate the share icon 1402 as part of the interface, as shown in FIG. 14.

At block 2304, responsive to user selection of the share icon 1402, a mechanism selection interface (e.g., selection interface 1408) is generated and presented to a user of the messaging client application 104. Specifically, the selection interface 1408 presents a number of third-party communication mechanisms (e.g., text (or SMS) messaging, email, Twitter, etc.) that may be selected by the user for communication of a message.

At block 2306, and responsive user selection of a selected communication mechanism, the messaging client application 104 creates a message including a network location identifier (e.g., a URL) identifying a network resource (e.g., the webpage 1404) containing information relating to an event. This message is created in a format to be communicated to a second computing device (e.g., a client device 102) of a second user via the selected third-party communication mechanism(s).

At block 2308, the messaging server system 108 receives a request, including the network location identifier, from the second computing device (e.g., the client device 102) of the second user to access the network resource (e.g., the webpage 1404). At block 2310, and responsive to the request from the second computing device to access the network resource, the messaging server system 108 generates and causes presentation an event invitation interface (e.g., the webpage 1404 or the webpage 1510), the event invitation interface including a first user-selectable indicium (e.g., the download button 1410, the button 1504 or the button 1508) to register with the messaging system.

In one example, first user-selectable indicium is user-selectable to generate and cause presentation of a third-party communication platform interface (e.g., the webpage 1506) to receive third-party communication platform recipient data for the second user, so as to enable the messaging system 100 to provide updates pertaining to the event to the second user via the third-party communication platform. The third-party communication platform may be an SMS platform, and the recipient data for the second user comprises a mobile telephone number.

The first user-selectable indicium may also be user-selectable to generate and sent a registration request from the second computing device to generate a registration interface. In this case, responsive to receiving the registration request from the second computing device, the messaging server system 108 generates and causes presentation a registration interface (e.g., webpage 1506 or webpage 1510) to receive registration information from the second user.

The first user-selectable indicium may also be user-selectable to invoke to download a platform-based messaging client application (e.g., messaging client application 104) associated with a messaging system (e.g., the messaging system 100) to the second computing device (e.g., client device 102), and to join the second user to a group chat, hosted by the messaging system and pertaining to the event.

In one or more examples, the first user-selectable indicium is user-selectable to issue a request to the messaging system (e.g., messaging system 100) to download the platform-based messaging client application (e.g., messaging client application 104), the request further including a user identifier associated with the second user and an event identifier associated with the event, the user identifier and the event identifier being used by the messaging system to join the second user to the group chat pertaining to the event.

The event invitation interface may also include a second user-selectable indicium, distinct from the first user-selectable indicium, the first user-selectable indicium (e.g., button 1508) being user-selectable to generate a request for a user registration interface to register a user as a user of a customized messaging application associated with the messaging system and the second user-selectable indicium (e.g., button 1504) being used-selectable to generate a request for a third-party communication platform interface to register a user to receive updates pertaining to the event via the third-party communication platform.

In some examples, the request to access the network resource further includes an identifier for the first user so that the network resource (e.g., webpage 1404) may be customized for the first user. Further, an event invitation interface (e.g., webpage 1404) includes an invitation response indicium that is user-selectable by the second user to provide a response to an invitation to attend the event.

Figure 24:
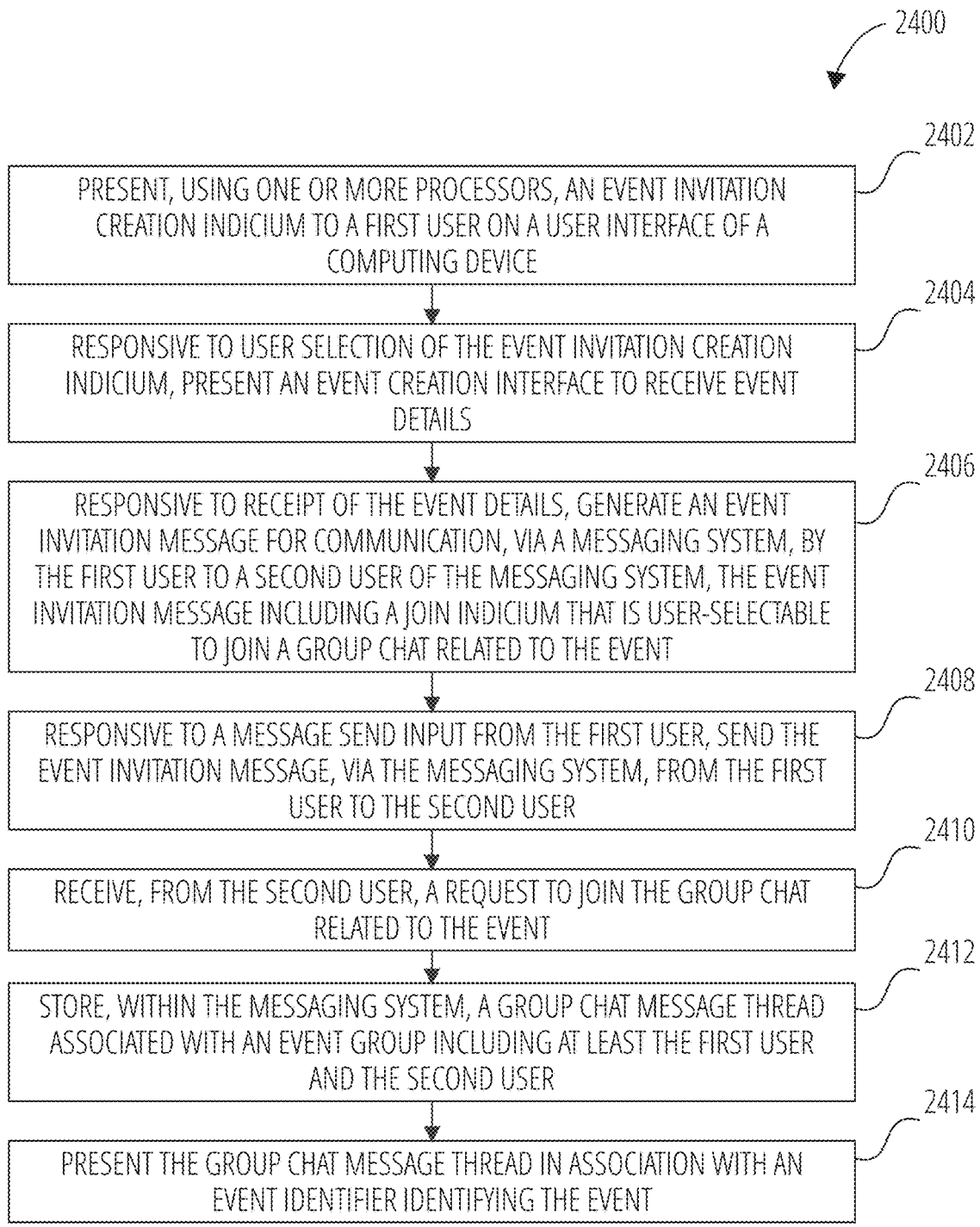
FIG. 24 illustrates a method 2400 in accordance with some examples.

FIG. 24 is a flowchart illustrating a method 2400, according to some examples, to manage an event invitation in a computer network to the environment. The method 2400 is performed by the messaging system 100, and commences at block 2402 with the presentation, using one or more processors (e.g., of the client device 102 or the messaging server system 108), of an event invitation creation indicium (e.g., the event invitation icon 804 shown in FIG. 8) within the context of a user interface (e.g., the user interface 802). The user interface may be presented as one of multiple user interfaces displayed on a display screen of the client device 102 by the messaging client application 104.

At block 2404, and responsive to a user selection of the event invitation creation indicium, the messaging client application 104 presents an event creation interface (e.g., the event creation user interface 902) to a user, this interface to receive event details as described above with reference to FIG. 9.

At block 2406, responsive to receipt of the event details (e.g., received responsive to user selection of the create event button 912), an event invitation message is generated. This event invitation message may be created as an interactive image overlay, such as the event invitation 1004 shown above in FIG. 10 that a user can then communicate as part of a multimedia message via the messaging system 100 to another user. The interactive image overlay is user-selectable to cause presentation of details of the event, and to join a group chat pertaining to the event, as is illustrated above and described with reference to FIG. 11). To this end, the event invitation message includes a join indicium (e.g., the join chat icon 1114) that is user-selectable to join the group chat related to the event.

Responsive to receipt of a send message input from an inviting user, the messaging client application 10, at block 2408, sends the event invitation message (e.g., a multimedia message, including the interactive media overlay) via the messaging system 100 from the inviting user (e.g., the message sender) to an invited user (e.g., the message receiver) as a direct message. The invited receiver, when viewing the multimedia message, is presented with a user interface such as that shown in FIG. 10, and presented with a view invite selector 1006 that is user-selectable to present an invitation to detail interface, such as that shown in FIG. 11. By selection of the icon join chat icon 1114, the invited user may send a request to join the group chat related to the event from an instance of the messaging client application 104 executing on the invited users' client device 102 to the application server 112, and specifically the group invitation system 120. The group invitation system, at block 2410, receives, from the invited user, the request to joining the group chat.

At block 2412, responsive to receipt of the request to join the group chat from the invited user, the group invitation system 120 joins the invited user to the group chat by updating the group chat data 504 to indicate a join of the invited user, based on user data 506. The group invitation system 120 may furthermore store, within the messaging system 100 and more specifically the database 124, a group chat message thread (e.g., as part of the messages 512) associated with the event group, this event group including at least the inviting and the invited users. At block 2414, the group invitation system 120 may then cause presentation of the group message thread, in association with an event identifier identifying the event. To this end, the group invitation system 120 interacts with the messaging server application, to present a group chat message feed within the appropriate user interfaces of the messaging client application 104 of each member of the event group. FIG. 12 illustrates an example of such a group chat message feed (including a group chat message thread) that may be presented by the messaging client application 104 to users.

Figure 25:
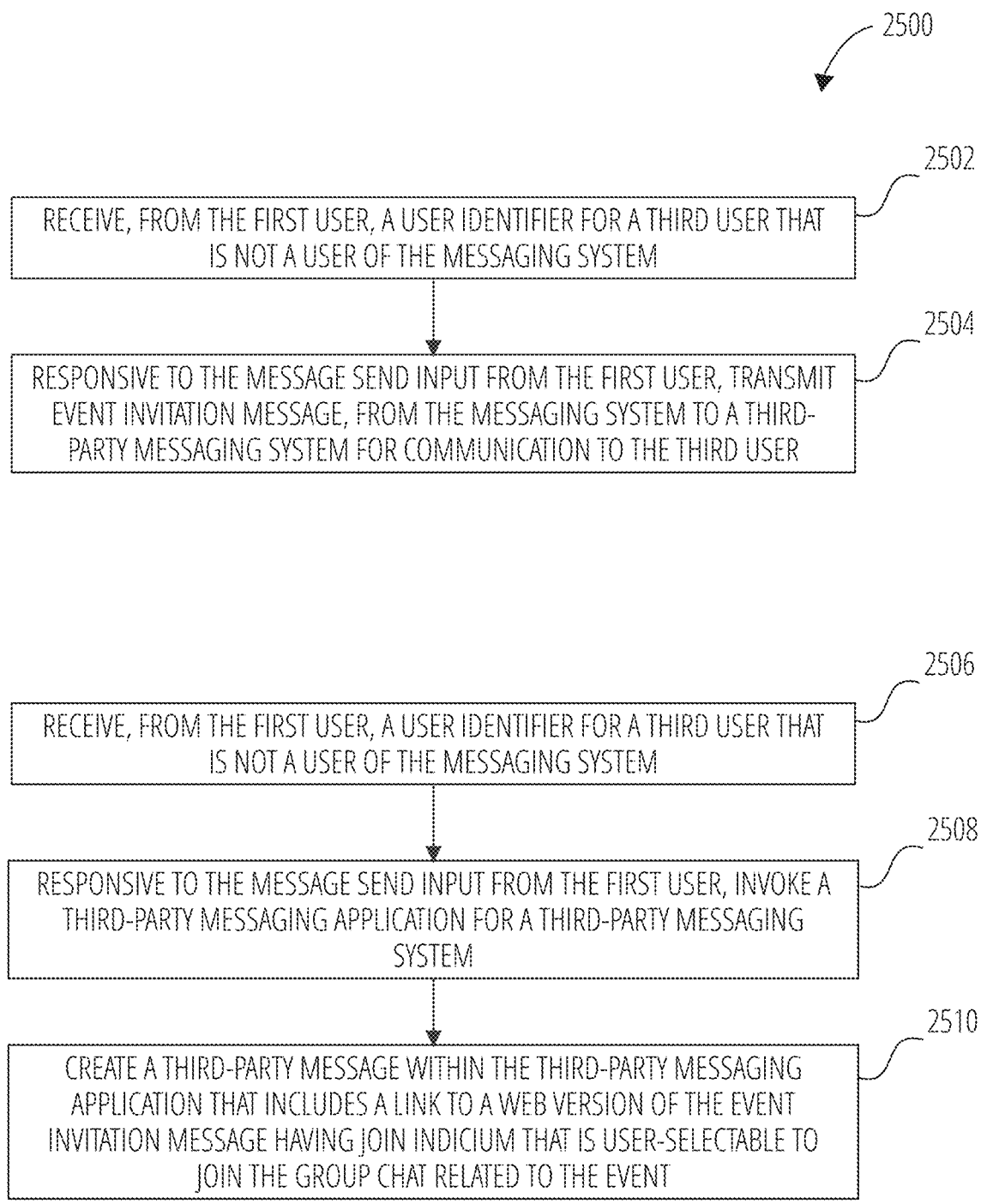
FIG. 25 illustrates a method 2500 in accordance with some examples.

FIG. 25 is a flowchart illustrating a further method 2500 of facilitating invitations to a group chat to persons that may not be current users of a particular messaging system 100. The method 2500 commences at block 2502 with the receipt, from an inviting user, of a user identifier (e.g., an email address or other addressing identifier) for a person that is not a user of the messaging system 100. At block 2504 and responsive to a message is sent input received from the inviting user, a messaging client application 104 of the sending user transmits an event invitation message, from the messaging system 100 (e.g., either directly from the messaging client application 104 or from the messaging server system 108) to a third-party messaging system for communication to the third user.

In a further embodiment, at block 2506, the messaging client application 104 receives, from the inviting user, a user identifier for a person that is not a user of the messaging system, and at block 2508, responsive to the message sent input from the inviting user, invokes a third-party messaging application (e.g., an email application), and, at block 2510, creates a message, within the third-party messaging application, that includes a link to a web version of an event invitation message, this web version of the event invitation message having a join indicium (e.g., URL) that is user-selectable to join a group chat related to the relevant event.

Figure 26:
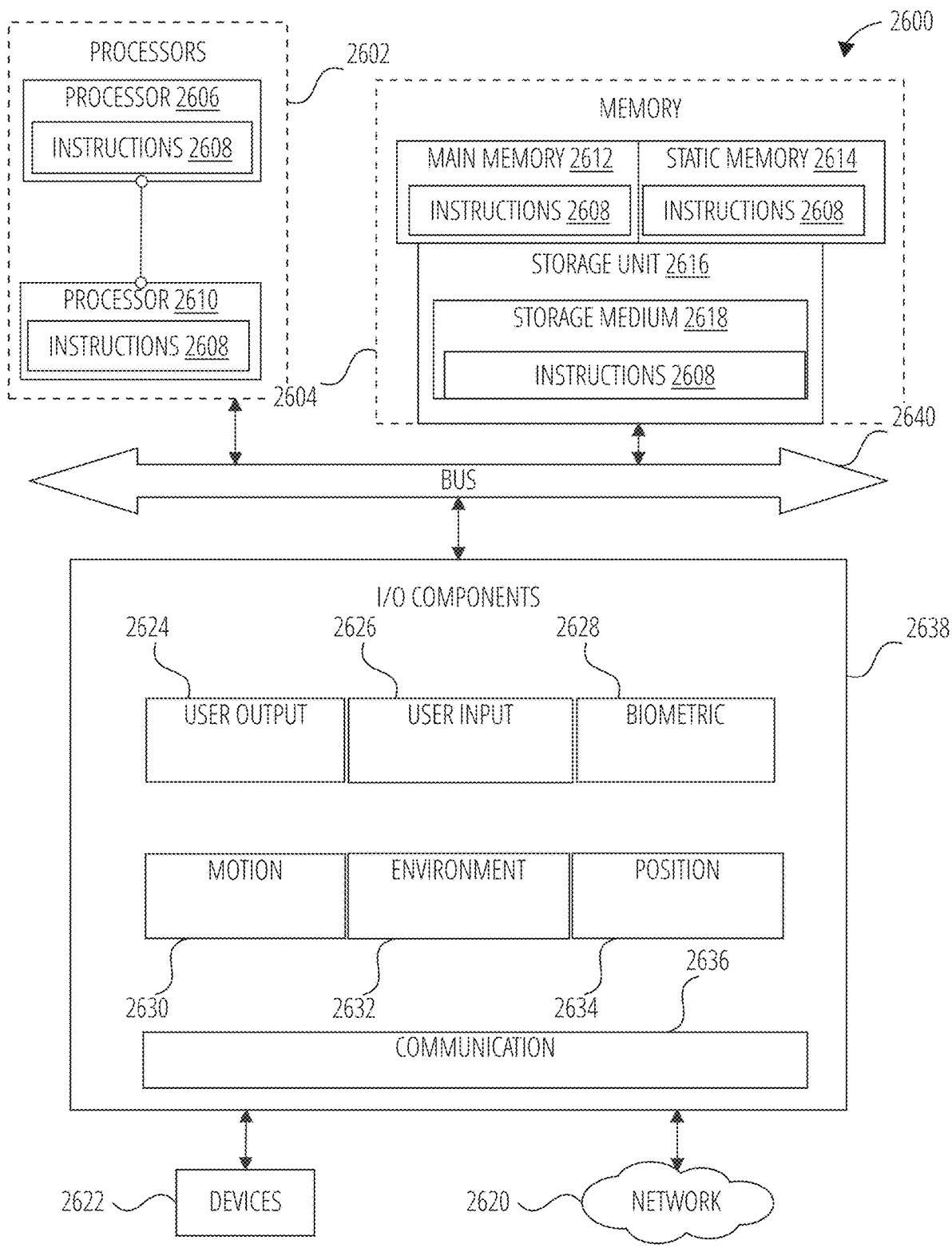
FIG. 26 is a diagrammatic representation of a machine in the form of a computer system within which a set of instructions may be executed for causing the machine to perform any one or more of the methodologies discussed herein, in accordance with some examples.

FIG. 26 is a diagrammatic representation of the machine 2600 within which instructions 2608 (e.g., software, a program, an application, an applet, an app, or other executable code) for causing the machine 2600 to perform any one or more of the methodologies discussed herein may be executed. For example, the instructions 2608 may cause the machine 2600 to execute any one or more of the methods described herein. The instructions 2608 transform the general, non-programmed machine 2600 into a particular machine 2600 programmed to carry out the described and illustrated functions in the manner described. The machine 2600 may operate as a standalone device or may be coupled (e.g., networked) to other machines. In a networked deployment, the machine 2600 may operate in the capacity of a server machine or a client machine in a server-client network environment, or as a peer machine in a peer-to-peer (or distributed) network environment. The machine 2600 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2608, sequentially or otherwise, that specify actions to be taken by the machine 2600. Further, while only a single machine 2600 is illustrated, the term "machine" shall also be taken to include a collection of machines that individually or jointly execute the instructions 2608 to perform any one or more of the methodologies discussed herein.

The machine 2600 may include processors 2602, memory 2604, and I/O components 2638, which may be configured to communicate with each other via a bus 2640. In an example embodiment, the processors 2602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 2606 and a Processor 2610 that execute the instructions 2608. The term "Processor" is intended to include multi-core processors that may comprise two or more independent processors (sometimes referred to as "cores") that may execute instructions contemporaneously. Although FIG. 26 shows multiple processors 2602, the machine 2600 may include a single Processor with a single core, a single Processor with multiple cores (e.g., a multi-core Processor), multiple processors with a single core, multiple processors with multiples cores, or any combination thereof.

The memory 2604 includes a main memory 2612, a static memory 2614, and a storage unit 2616, both accessible to the processors 2602 via the bus 2640. The main memory 2604, the static memory 2614, and storage unit 2616 store the instructions 2608 embodying any one or more of the methodologies or functions described herein. The instructions 2608 may also reside, completely or partially, within the main memory 2612, within the static memory 2614, within computer-readable storage medium 2618 within the storage unit 2616, within at least one of the processors 2602 (e.g., within the Processor's cache memory), or any suitable combination thereof, during execution thereof by the machine 2600.

The I/O components 2638 may include a wide variety of components to receive input, provide output, produce output, transmit information, exchange information, capture measurements, and so on. The specific I/O components 2638 that are included in a particular machine will depend on the type of machine. For example, portable machines such as mobile phones may include a touch input device or other such input mechanisms, while a headless server machine will likely not include such a touch input device. It will be appreciated that the I/O components 2638 may include many other components that are not shown in FIG. 26. In various examples, the I/O components 2638 may include user output components 2624 and user input components 2626. The user output components 2624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 2638 may include biometric components 2628, motion components 2630, environmental components 2632, or position components 2634, among a wide array of other components. For example, the biometric components 2628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2630 include acceleration sensor components (e.g., accelerometer), gravitation sensor components, rotation sensor components (e.g., gyroscope). The environmental components 2632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2638 further include communication components 2636 operable to couple the machine 2600 to a network 2620 or devices 2622 via respective coupling or connections. For example, the communication components 2636 may include a network interface Component or another suitable device to interface with the network 2620. In further examples, the communication components 2636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2622 may be another machine or any of a wide variety of peripheral devices (e.g., a peripheral device coupled via a USB).

Moreover, the communication components 2636 may detect identifiers or include components operable to detect identifiers. For example, the communication components 2636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2636, such as location via Internet Protocol (IP) geolocation, location via Wi-Fi® signal triangulation, location via detecting an NFC beacon signal that may indicate a particular location, and so forth.

The various memories (e.g., main memory 2612, static memory 2614, and/or memory of the processors 2602) and/or storage unit 2616 may store one or more sets of instructions and data structures (e.g., software) embodying or used by any one or more of the methodologies or functions described herein. These instructions (e.g., the instructions 2608), when executed by processors 2602, cause various operations to implement the disclosed embodiments.

The instructions 2608 may be transmitted or received over the network 2620, using a transmission medium, via a network interface device (e.g., a network interface component included in the communication components 2636) and using any one of several well-known transfer protocols (e.g., hypertext transfer protocol (HTTP)). Similarly, the instructions 2608 may be transmitted or received using a transmission medium via a coupling (e.g., a peer-to-peer coupling) to the devices 2622.

Figure 27:
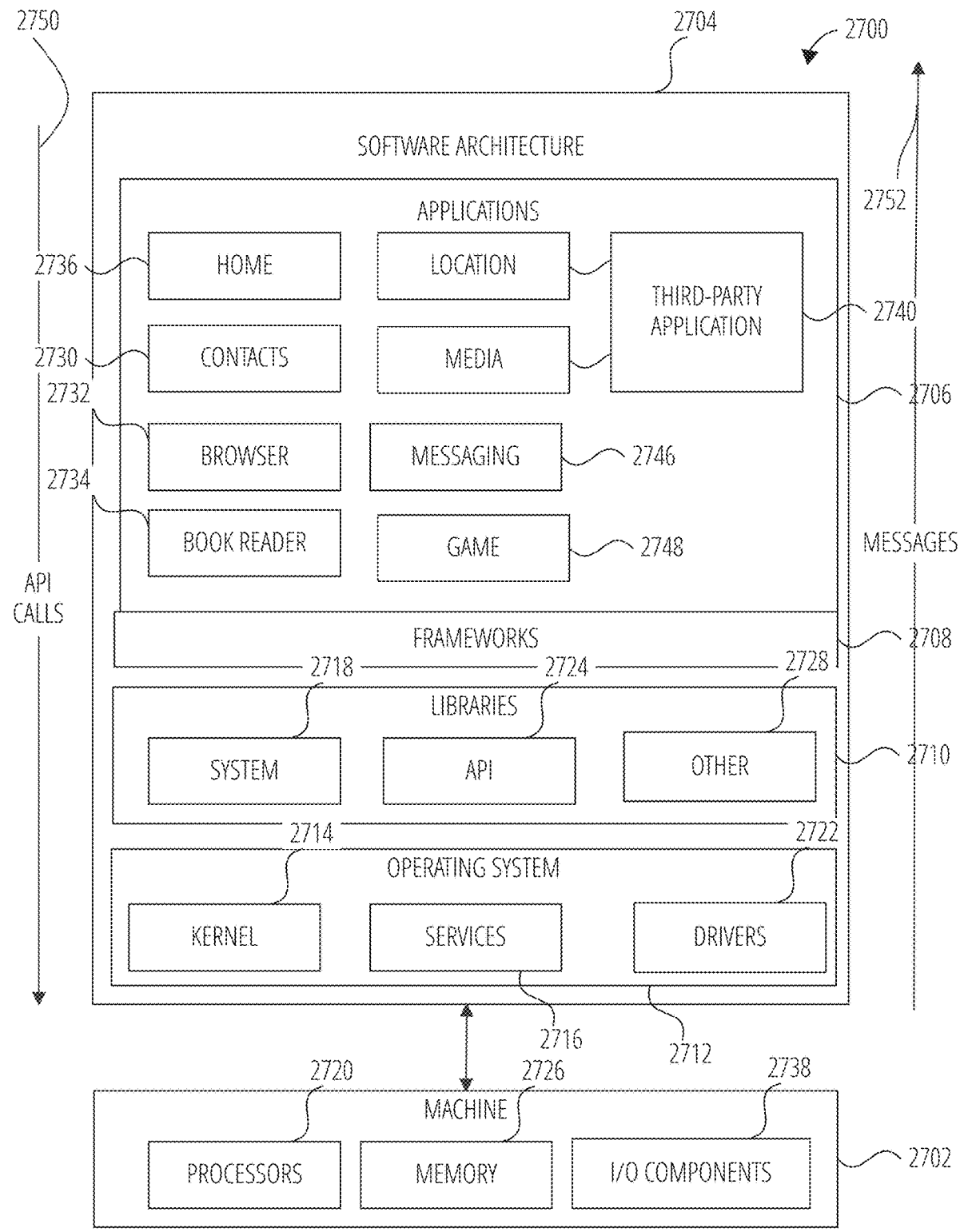
FIG. 27 is a block diagram showing a software architecture within which the present disclosure may be implemented, according to some examples.

FIG. 27 is a block diagram 2700 illustrating a software architecture 2704, which can be installed on any one or more of the devices described herein. The software architecture 2704 is supported by hardware such as a machine 2702 that includes processors 2720, memory 2726, and I/O components 2738. In this example, the software architecture 2704 can be conceptualized as a stack of layers, where each layer provides a particular functionality. The software architecture 2704 includes layers such as an operating system 2712, libraries 2710, frameworks 2708, and applications 2706. Operationally, the applications 2706 invoke API calls 2750 through the software stack and receive messages 2752 in response to the API calls 2750.

The operating system 2712, manages hardware resources and provides common services. The operating system 2712 includes, for example, a kernel 2714, services 2716, and drivers 2722. The kernel 2714 acts as an abstraction layer between the hardware and the other software layers. For example, the kernel 2714 provides memory management, processor management (e.g., scheduling), Component management, networking, and security settings, among other functionality. The services 2716 can provide other common services for the other software layers. The drivers 2722 are responsible for controlling or interfacing with the underlying hardware. For instance, the drivers 2722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 2710 provide a common low-level infrastructure used by the applications 2706. The libraries 2710 can include system libraries 2718 (e.g., C standard library) that provide functions such as memory allocation functions, string manipulation functions, mathematic functions, and the like. In addition, the libraries 2710 can include API libraries 2724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2710 can also include a wide variety of other libraries 2728 to provide many other APIs to the applications 2706.

The frameworks 2708 provide a high-level common infrastructure that is used by the applications 2706. For example, the frameworks 2708 provide various graphical user interface (GUI) functions, high-level resource management, and high-level location services. The frameworks 2708 can provide a broad spectrum of other APIs that can be used by the applications 2706, some of which may be specific to a particular operating system or platform.

In an example embodiment, the applications 2706 may include a home application 2736, a contacts application 2730, a browser application 2732, a book reader application 2734, a location application 2742, a media application 2744, a messaging application 2746, a game application 2748, and a broad assortment of other applications such as a third-party application 2740. The applications 2706 are programs that execute functions defined in the programs. Various programming languages can be employed to create one or more of the applications 2706, structured in a variety of manners, such as object-oriented programming languages (e.g., Objective-C, Java, or C++) or procedural programming languages (e.g., C or assembly language). In a specific example, the third-party application 2740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2740 can invoke the API calls 2750 provided by the operating system 2712 to facilitate functionality described herein.

EXAMPLES

1. A method to manage an event invitation in a computer network environment, the method comprising:
   presenting, using one or more processors, an event invitation creation indicium to a first user on a user interface of a computing device;
   responsive to user selection of the event invitation creation indicium, presenting an event creation interface to receive event details relating to an event;
   responsive to receipt of the event details, generating an event invitation message for communication, via a messaging system, by the first user to a second user of the messaging system, the event invitation message including a join indicium that is user-selectable to join a group chat related to the event;
   responsive to a message send input from the first user, sending the event invitation message, via the messaging system, from the first user to the second user;
   receiving, from the second user, a request to join the group chat related to the event; and
   storing, within the messaging system, a group chat message thread associated with an event group including at least the first user and the second user.

2. The method of any one or more of the preceding examples, including presenting the group chat message thread in association with an event identifier identifying the event.

3. The method of any one or more of the preceding examples, wherein the event invitation message includes a response indicium that is user-selectable to provide an attendance response to the event invitation message.

4. The method of any one or more of the preceding examples, comprising:
   receiving, from the first user, a user identifier for a third user that is not a user of the messaging system; and
   responsive to the message send input from the first user, transmitting the event invitation message, from the messaging system to a third-party messaging system for communication to the third user.

5. The method of example 1, comprising:
   receiving, from the first user, a user identifier for a third user that is not a user of the messaging system;
   responsive to the message send input from the first user, invoking a third-party messaging application for a third-party messaging system;
   creating a third-party message within the third-party messaging application that includes data pertaining to the event.

6. The method of any one or more of the preceding examples, wherein the data pertaining to the event includes a link to a web version of the event invitation message.

7. The method of any one or more of the preceding examples, wherein the web version of the event invitation message includes a join indicium that is user-selectable to join the group chat related to the event.

8. The method of any one or more of the preceding examples, wherein the web version of the event invitation message includes an update indicium that is user-selectable to receive updates regarding the event via the third-party messaging system.

9. A computing apparatus, the computing apparatus comprising:
   a processor; and
   a memory storing instructions that, when executed by the processor, configure the apparatus to:
   cause presentation of an event invitation creation indicium to a first user on a user interface of a computing device;
   responsive to user selection of the event invitation creation indicium, presenting an event creation interface to receive event details for an event;
   responsive to receipt of the event details, generating an event invitation message for communication, via a messaging system, by the first user to a second user of the messaging system, the event invitation message including a join indicium that is user-selectable to join a group chat related to the event;
   responsive to a message send input from the first user, sending the event invitation message, via the messaging system, from the first user to the second user;
   receive, from the second user, a request to join the group chat related to the event; and
   store, within the messaging system, a group chat message thread associated with an event group including at least the first user and the second user.

10. The computing apparatus of any one or more of the preceding examples, including presenting the group chat message thread in association with an event identifier identifying the event.

11. The computing apparatus of any one or more of the preceding examples, wherein the event invitation message includes a response indicium that is user-selectable to provide an attendance response to the event invitation message.

12. The computing apparatus of any one or more of the preceding examples, comprising:
   receive, from the first user, a user identifier for a third user that is not a user of the messaging system; and
   responsive to the message send input from the first user, transmitting the event invitation message, from the messaging system to a third-party messaging system for communication to the third user.

13. The computing apparatus of any one or more of the preceding examples, comprising:
   receive, from the first user, a user identifier for a third user that is not a user of the messaging system;

responsive to the message send input from the first user, invoking a third-party messaging application for a third-party messaging system;

create a third-party message within the third-party messaging application that includes data pertaining to the event.

14. The computing apparatus of any one or more of the preceding examples, wherein the data pertaining to the event includes a link to a web version of the event invitation message.

15. The computing apparatus of any one or more of the preceding examples, wherein the web version of the event invitation message includes a join indicium that is user-selectable to join the group chat related to the event.

16. The computing apparatus of any one or more of the preceding examples, wherein the web version of the event invitation message includes an update indicium that is user-selectable to receive updates regard the event via the third-party messaging system.

17. A non-transitory computer-readable storage medium, the computer-readable storage medium including instructions that when executed by a computer, cause the computer to:

present, using one or more processors, an event invitation creation indicium to a first user on a user interface of a computing device;

responsive to user selection of the event invitation creation indicium, presenting an event creation interface to receive event details of an event;

responsive to receipt of the event details, generating an event invitation message for communication, via a messaging system, by the first user to a second user of the messaging system, the event invitation message including a join indicium that is user-selectable to join a group chat related to the event;

responsive to a message send input from the first user, sending the event invitation message, via the messaging system, from the first user to the second user;

receive, from the second user, a request to join the group chat related to the event; and store, within the messaging system, a group chat message thread associated with an event group including at least the first user and the second user.

18. The computer-readable storage medium of any one or more of the preceding examples, including presenting the group chat message thread in association with an event identifier identifying the event.

19. The computer-readable storage medium of any one or more of the preceding examples, wherein the event invitation message includes a response indicium that is user-selectable to provide an attendance response to the event invitation message.

20. The computer-readable storage medium of v, comprising:

receive, from the first user, a user identifier for a third user that is not a user of the messaging system; and responsive to the message send input from the first user, transmitting the event invitation message, from the messaging system to a third-party messaging system for communication to the third user.

21. The computer-readable storage medium of any one or more of the preceding examples, comprising:

receive, from the first user, a user identifier for a third user that is not a user of the messaging system;

responsive to the message send input from the first user, invoking a third-party messaging application for a third-party messaging system;

create a third-party message within the third-party messaging application that includes data pertaining to the event.

22. The computer-readable storage medium of any one or more of the preceding examples, wherein the data pertaining to the event includes a link to a web version of the event invitation message.

23. The computer-readable storage medium of any one or more of the preceding examples, wherein the web version of the event invitation message includes a join indicium that is user-selectable to join the group chat related to the event.

24. The computer-readable storage medium of any one or more of the preceding examples, wherein the web version of the event invitation message includes an update indicium that is user-selectable to receive updates regard the event via the third-party messaging system.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    determining, by a computing system including one or more computing devices having one or more processors and memory, first location information of a computing device of a user of a messaging application;
    causing, by the computing system and based on the first location information, presentation of a map interface, the map interface including an event icon indicating a location that corresponds to an event;
    determining, by the computing system, selection of the event icon;
    in response to determining the selection of the event icon, causing, by the computing system, presentation of an additional user interface, the additional user interface including an invitation to the event and an indicium that is selectable to join the user to a group chat that corresponds to the event;
    in response to determining selection of the indicium, causing, by the computing system, joining of the user to the group chat;
    determining, by the computing system, second location information of the computing device of the user, the second location information being determined after the user joins the group chat;
    detecting, by the computing system, that the user has joined the group chat and that the second location information, as determined after the user joins the group chat, indicates that the user is within a predetermined proximity of the location that corresponds to the event; and
    in response to detecting that the user has joined the group chat and that the second location information indicates that the user is within the predetermined proximity of the location that corresponds to the event:
        updating, by the computing system, the event icon to obtain an updated event icon that has a different appearance than the event icon and is user-selectable to interact with one or more members of the group chat; and
        causing, by the computing system, presentation of the updated event icon in the map interface.

2. The method of claim 1, comprising:
    in response to determining the selection of the indicium, causing presentation of a further additional user interface, the further additional user interface replacing the presentation of the additional user interface and displaying one or more messages of the group chat to the user within the messaging application;
    receiving a message from the user via a message input field of the further additional user interface; and
    making the message accessible to other users in the group chat.

3. The method of claim 1, comprising:
    determining, by the computing system, that a start of the event is within a predetermined time parameter; and
    in response to determining that the start of the event is within the predetermined time parameter, causing, by the computing system, additional information about the event to be displayed in the map interface.

4. The method of claim 1, wherein the map interface includes one or more additional icons indicating a location of a friend of the user in relation to the location that corresponds to the event.

5. The method of claim 1, comprising:
    creating, by the computing system, a message including a network location identifier identifying a network resource containing information relating to the event; and
    causing, by the computing system, the message to be transmitted via one or more communication mechanisms.

6. The method of claim 5, wherein the group chat is hosted by a messaging system that corresponds to the messaging application and the one or more communication mechanisms correspond to one or more third-party communication platforms.

7. The method of claim 1, comprising:
    receiving, by the computing system and based on the selection of the indicium, a request to join the user to the group chat; and
    updating, by the computing system, group chat data to indicate that the user has joined the group chat.

8. The method of claim 1, wherein updating the event icon comprises changing an appearance of the event icon to indicate one or more available actions, the one or more available actions comprising participating within a discussion on the group chat regarding the event.

9. A computing apparatus comprising:
    one or more processors; and
    a memory storing instructions that, when executed by the one or more processors, configure the computing apparatus to:
    determine first location information of a computing device of a user of a messaging application;
    cause presentation of a map interface based on the first location information, the map interface including an event icon indicating a location that corresponds to an event;
    determine selection of the event icon;
    in response to determining the selection of the event icon, cause presentation of an additional user interface, the additional user interface including an invitation to the event and an indicium that is selectable to join the user to a group chat that corresponds to the event;
    in response to determining selection of the indicium, cause joining of the user to the group chat;

determine second location information of the computing device of the user, the second location information being determined after the user joins the group chat;

detect that the user has joined the group chat and that the second location information indicates that the user is within a predetermined proximity of the location that corresponds to the event; and in response to detecting that the user has joined the group chat and that the second location information, as determined after the user joins the group chat, indicates that the user is within the predetermined proximity of the location that corresponds to the event:

update the event icon to obtain an updated event icon that has a different appearance than the event icon and is user-selectable to interact with one or more members of the group chat; and cause presentation of the updated event icon in the map interface.

10. The computing apparatus of claim 9, wherein the memory stores additional instructions that, when executed by the one or more processors configure the computing apparatus to:

in response to determining the selection of the indicium, cause presentation of a further additional user interface, the further additional user interface replacing the presentation of the additional user interface and displaying one or more messages of the group chat to the user within the messaging application;

receive a message from the user via a message input field of the further additional user interface; and make the message accessible to other users in the group chat.

11. The computing apparatus of claim 9, wherein the memory stores additional instructions that, when executed by the one or more processors configure the computing apparatus to:

determine that a start of the event is within a predetermined time parameter; and in response to determining that the start of the event is within the predetermined time parameter, cause additional information about the event to be displayed in the map interface.

12. The computing apparatus of claim 9, wherein the map interface includes one or more additional icons indicating a location of a friend of the user in relation to the location that corresponds to the event.

13. The computing apparatus of claim 9, wherein the memory stores additional instructions that, when executed by the one or more processors configure the computing apparatus to:

create a message including a network location identifier identifying a network resource containing information relating to the event; and cause the message to be transmitted via one or more communication mechanisms.

14. The computing apparatus of claim 13, wherein the group chat is hosted by a messaging system that corresponds to the messaging application and the one or more communication mechanisms correspond to one or more third-party communication platforms.

15. The computing apparatus of claim 9, wherein the memory stores additional instructions that, when executed by the one or more processors configure the computing apparatus to:

receive, based on the selection of the indicium, a request to join the user to the group chat; and update group chat data to indicate that the user has joined the group chat.

16. One or more non-transitory computer-readable storage media including instructions that when executed by one or more processors, cause the one or more processors to:

determine first location information of a computing device of a user of a messaging-client application;

cause presentation of a map interface based on the first location information, the map interface including an event icon indicating a location that corresponds to an event;

determine selection of the event icon;

in response to determining the selection of the event icon, cause presentation of an additional user interface, the additional user interface including an invitation to the event and an indicium that is selectable to join the user to a group chat that corresponds to the event;

in response to determining selection of the indicium, cause joining of the user to the group chat;

determine second location information of the computing device of the user, the second location information being determined after the user joins the group chat;

detect that the user has joined the group chat and that the second location information indicates that the user is within a predetermined proximity of the location that corresponds to the event; and in response to detecting that the user has joined the group chat and that the second location information, as determined after the user joins the group chat, indicates that the user is within the predetermined proximity of the location that corresponds to the event:

update the event icon to obtain an updated event icon that has a different appearance than the event icon and is user-selectable to interact with one or more members of the group chat; and cause presentation of the updated event icon in the map interface.

17. The one or more non-transitory computer-readable storage media of claim 16, including additional instructions that, when executed by one or more processors, cause the one or more processors to:

in response to determining the selection of the indicium, cause presentation of a further additional user interface, the further additional user interface replacing the presentation of the additional user interface and displaying one or more messages of the group chat to the user within the messaging application;

receive a message from the user via a message input field of the further additional user interface; and make the message accessible to other users in the group chat.

18. The one or more non-transitory computer-readable storage media of claim 16, including additional instructions that, when executed by one or more processors, cause the one or more processors to:

determine that a start of the event is within a predetermined time parameter; and in response to determining that the start of the event is within the predetermined time parameter, cause additional information about the event to be displayed in the map interface.

19. The one or more non-transitory computer-readable storage media of claim 16, wherein the map interface includes one or more additional icons indicating a location of a friend of the user in relation to the location that corresponds to the event.

20. The one or more non-transitory computer-readable storage media of claim 16, wherein the one or more non-transitory computer-readable storage media including additional instructions that, when executed by one or more processors, cause the one or more processors to:
   create a message including a network location identifier identifying a network resource containing information relating to the event; and
   cause the message to be transmitted via one or more communication mechanisms.

\* \* \* \* \*